(12) United States Patent
Carlson et al.

(10) Patent No.: US 9,075,653 B2
(45) Date of Patent: Jul. 7, 2015

(54) EMBEDDING SUPPLEMENTAL CONSUMER DATA

(71) Applicants: Mark Carlson, Half Moon Bay, CA (US); Steven Cheatham, Pittsburg, CA (US)

(72) Inventors: Mark Carlson, Half Moon Bay, CA (US); Steven Cheatham, Pittsburg, CA (US)

(73) Assignee: Visa International Service Association, San Francisco, CA (US)

( * ) Notice: Subject to any disclaimer, the term of this patent is extended or adjusted under 35 U.S.C. 154(b) by 27 days.

(21) Appl. No.: 13/794,613

(22) Filed: Mar. 11, 2013

(65) Prior Publication Data

US 2013/0312111 A1 Nov. 21, 2013

Related U.S. Application Data

(60) Provisional application No. 61/609,112, filed on Mar. 9, 2012.

(51) Int. Cl.
*G06F 21/30* (2013.01)
*G06F 7/499* (2006.01)
*G06F 21/00* (2013.01)
*G06F 21/62* (2013.01)
*H04L 9/32* (2006.01)
*G06Q 30/06* (2012.01)

(52) U.S. Cl.
CPC ............ *G06F 7/49936* (2013.01); *G06F 21/30* (2013.01); *G06F 21/00* (2013.01); *G06F 21/629* (2013.01); *H04L 9/3226* (2013.01); *G06Q 30/06* (2013.01)

(58) Field of Classification Search
None
See application file for complete search history.

(56) References Cited

U.S. PATENT DOCUMENTS

| | | | |
|---|---|---|---|
| 4,860,003 A | | 8/1989 | De Luca et al. |
| 6,360,254 B1 * | | 3/2002 | Linden et al. ................. 709/219 |
| 6,859,151 B2 | | 2/2005 | He et al. |
| 7,190,788 B2 | | 3/2007 | Yang et al. |
| 2002/0087476 A1 * | | 7/2002 | Salas et al. ...................... 705/59 |
| 2004/0254836 A1 * | | 12/2004 | Emoke Barabas et al. ..... 705/14 |
| 2009/0183229 A1 * | | 7/2009 | Ohnishi ............................ 726/2 |
| 2010/0318783 A1 | | 12/2010 | Raj et al. |

FOREIGN PATENT DOCUMENTS

| | | |
|---|---|---|
| EP | 0415979 B1 | 1/1996 |
| WO | 83-01548 A1 | 4/1983 |
| WO | 2006-066322 A1 | 6/2006 |

OTHER PUBLICATIONS

International Search Report and Written Opinion in PCT Application No. PCT/US2013/030280, 12 pages.

* cited by examiner

*Primary Examiner* — David Pearson

(74) *Attorney, Agent, or Firm* — Kilpatrick Townsend & Stockton LLP

(57) ABSTRACT

Embodiments of the invention broadly described, introduce systems and methods for combining multiple field values into a normalized value, generating codes using the normalized value, and using the codes as activation codes. One embodiment of the invention discloses a computer-implemented method for generating a code. The method comprises receiving a plurality of field values associated with a set of fields, each of the fields being associated with a field radix, converting the field values into numeric field values, combining, by a processor, numeric field values, each associated with a field, each of the fields associated with a field radix, to generate a normalized value, and generating, by the processor, a code representative of the plurality of field values using the normalized value.

16 Claims, 16 Drawing Sheets

FIG. 14A

- 1401a: http://www.randomwebsite.com/
- 1402a: Activation Code:
- 1403a: NJp|CKTY
- 1404a: First Name
- 1405a: Last Name Initial
- 1406a: Date of Birth
- 1407a: Subscription Offer:

FIG. 14B

- 1401b: http://www.randomwebsite.com/
- 1402b: Activation Code:
- 1403b: NJp|CKTY
- 1404b: First Name: JOE
- 1405b: Last Name Initial: D
- 1406b: Date of Birth: 7/22/1973
- 1407b: Subscription Offer: 6 months

EMBEDDING SUPPLEMENTAL CONSUMER DATA

CROSS-REFERENCES TO RELATED APPLICATIONS

The present application is a non-provisional application of and claims priority to U.S. Provisional Application No. 61/609,112, filed on Mar. 9, 2012, the entire contents of which are herein incorporated by reference for all purposes.

BACKGROUND

Activation codes are codes that may be used to activate software, devices, features, coupons, or other entities at a computer. Activation codes are typically random alphanumeric strings generated at a server computer. Activation codes may be stored in a database and shared with a user. The user may then send the activation code to the server computer, which may verify that the activation code matches the code stored in the database. If so, the server computer may activate the software, device, feature, or other entity associated with the activation code. Otherwise, no activation may be performed.

Activation codes are widely utilized, but the infrastructure required to support their use is significant. For example, an activation code database is required to store all generated activation codes. Such a database may require significant amounts of computer storage and processing capabilities. Verification of activation codes requires querying the database, which requires additional network bandwidth and processing capabilities. In addition, if data is to be associated with an activation code, for example user data, the data also needs to be stored in the activation code database, further increasing storage requirements.

It may be desirable to share activation codes among multiple parties. For example, an encoding party generating an activation code and sending it to a user may want to enable a decoding party to verify the activation code. However, doing so may increase processing and network requirements substantially. For example, duplicating the activation code database requires both the encoding party and the decoding party to store the entire database and the decoding party to update the database on each change made by the encoding party. Alternately, the encoding party may allow the decoding party to query the activation code database, but this may increase network traffic for both the encoding and decoding parties, and may introduce insecurities to the encoding party network. Further, if the encoding party and the decoding party are not mutually accessible, such sharing may be impossible.

Embodiments of the invention address these and other problems.

SUMMARY

Embodiments of the invention broadly described, introduce systems and methods for combining multiple field values into a normalized value, generating codes using the normalized value, and using the codes as activation codes.

One embodiment of the invention discloses a computer-implemented method for generating a code. The method comprises receiving a plurality of field values associated with a set of fields, each of the fields being associated with a field radix, converting the field values into numeric field values, combining, by a processor, numeric field values, each associated with a field, each of the fields associated with a field radix, to generate a normalized value, and generating, by the processor, a code representative of the plurality of field values using the normalized value.

One embodiment of the invention discloses a server computer. The server computer comprises a processor and a non-transitory computer-readable storage medium, comprising code executable by the processor for implementing a method comprising receiving a plurality of field values associated with a set of fields, each of the fields being associated with a field radix, converting the field values into numeric field values, combining, by a processor, numeric field values, each associated with a field, each of the fields associated with a field radix, to generate a normalized value, and generating, by the processor, a code representative of the plurality of field values using the normalized value.

One embodiment of the invention discloses a computer-implemented method. The method comprises receiving, by a processor, an activation code, and retrieving a plurality of field values using the activation code and an activation code format. The method may further comprise receiving the activation code format, wherein the activation code format indicates the structure of data present in the activation code. The method may also further comprises validating a user input using one or more of the plurality of field values. The method also further comprise generating web page elements using one or more of the plurality of field values.

One embodiment of the invention discloses a computer. The computer comprises a processor and a non-transitory computer-readable storage medium, comprising code executable by the processor for implementing a method. The method comprises receiving, by a processor, an activation code, and retrieving a plurality of field values using the activation code and an activation code format. The method may further comprise receiving the activation code format, wherein the activation code format indicates the structure of data present in the activation code. The method may also further comprises validating a user input using one or more of the plurality of field values. The method also further comprise generating web page elements using one or more of the plurality of field values.

Further details regarding embodiments of the invention can be found in the Detailed Description and the Figures.

BRIEF DESCRIPTION OF THE DRAWINGS

FIG. 14(a) illustrates a web page comprising a form that may be used in some embodiments of the invention.

FIG. 14(b) illustrates a web page comprising a form that is automatically filled using the activation code.

DETAILED DESCRIPTION

Figure 1:
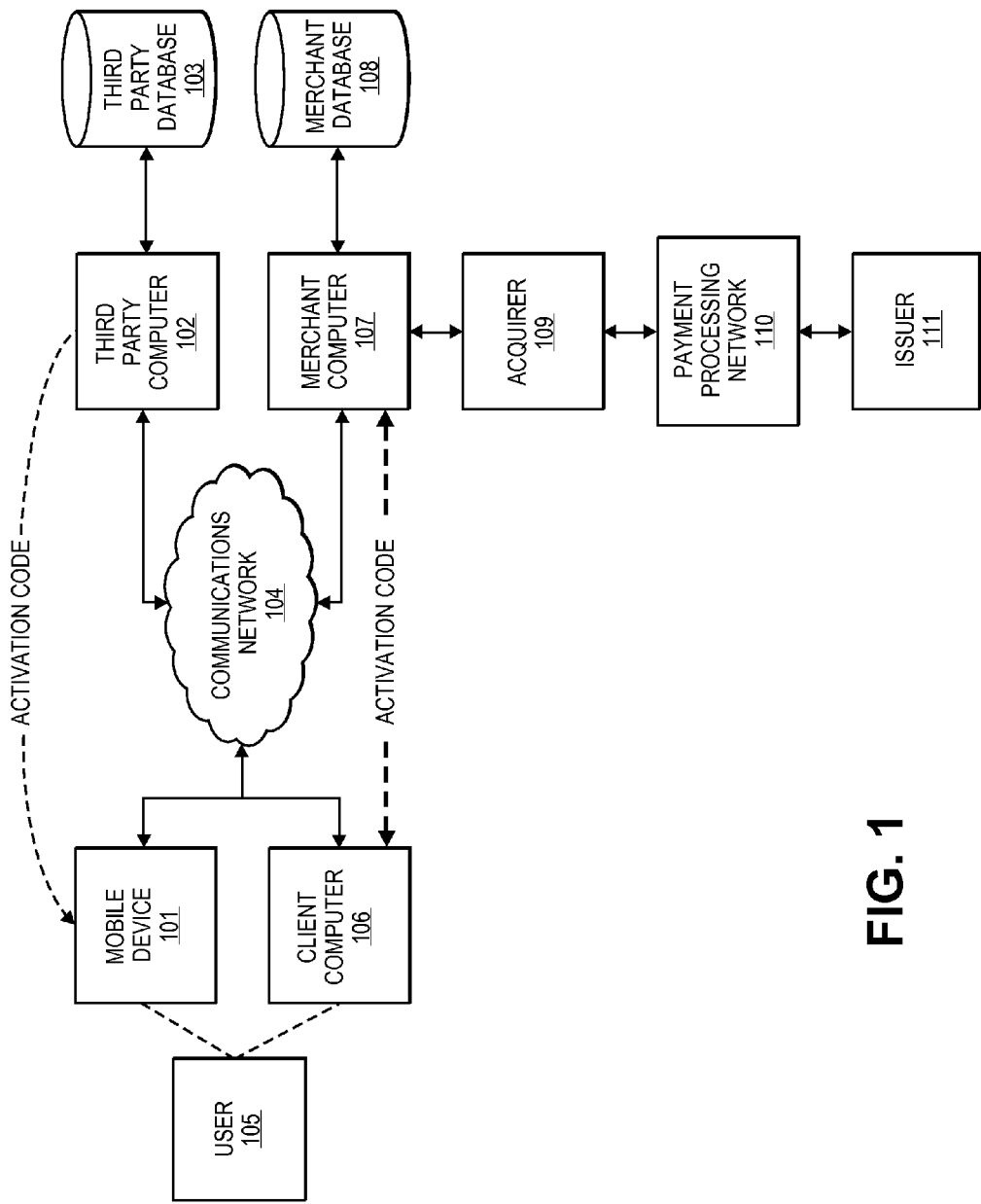
FIG. 1 shows a block diagram of a system according to an embodiment of the invention.

Prior to discussing embodiments of the invention, description of some terms may be helpful in understanding embodiments of the invention.

The term "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

An "access device" may refer to any suitable device for communicating with merchant and for interacting with a portable consumer device. An access device can be in any suitable location such as at the same location as a merchant. An access device may be in any suitable form. Some examples of access devices include POS terminals, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, Web-sites, and the like. Typically, an access device may use any suitable contact or contactless mode of operation to electronically transmit or receive data from a portable consumer device.

As used herein, the terms "radix" and "base" may be used interchangeably to refer to the number of unique digits, including zero, that a positional numeral system uses to represent numbers.

The term "field" may refer to any property or characteristic that may take a plurality of values. In various embodiments of the invention, a field may correspond to a column in a table, a data field in a database, an attribute in an object, or any other suitable property. A "field value" may be any suitable value for a field. One example of a field and associated field value may be: "user likes wine?", wherein the field value indicates whether or not the user likes wine. Another example may be: "user date of birth", wherein the field value indicates the user's date of birth.

A field value may contain alphabetic characters, numerals, symbols, or any combination thereof. A field value may be stored in a computer system as an integer, floating point number, string, object, or in any other suitable format. Examples of formats to store a plurality of field values may include XML, JSON, and serialized objects. In some embodiments, field values may also comprise non-printable characters.

A "field radix" may refer to the number of possible or acceptable field values for a given field. For example, if the field was "user likes wine?", the field radix would be 2 if the two possible field values are "YES" and "NO". In another example, if the field was "month of birth", the field radix would be 12 if the field values ranged from "1" to "12".

A "numeric field value" may refer to the field value when converted into a numeric value between 0 and the field radix minus one. For example, if a field is "birth month", the field values may correspond to the 12 months in the year. Accordingly, the field radix would be 12. The numeric field values may range from 0 (for January) to 11 (for December). In some cases, such as when the field values for a field are already numeric and range from 0 to the field radix minus one, the numeric field value may be the same as the field value. In other cases, a one-to-one mapping may be defined between each field value and a numeric field value in the range 0 to the field radix minus one.

A "normalized value" may refer to a value generated by combining multiple field values. In some embodiments of the invention, a normalized value may be a single numeric or string value which comprises the data stored in the multiple field values and may be used to retrieve the multiple field values. A normalized value may optionally be associated with a "normalized radix", which is a preferred radix to be used in the representation of the normalized value.

The term "code format" may be used to describe any information used to construct or format a code from a plurality of field values. The code format may also indicate the structure of data present in the code. For example, in some embodiments, a code format may include a plurality of fields, a listing of possible field values associated with the fields, field radices associated with the fields, numeric field values corresponding to each fields values, an ordering of fields when determining a normalized value, a normalized radix, and a method of encoding the normalized value into a code, and a method of representing the code. An example of information included in the code format may be found in Table 1. A code format may be stored in any suitable computer-readable format, such one or more XML files, program source files, or executable files.

Figure 6:
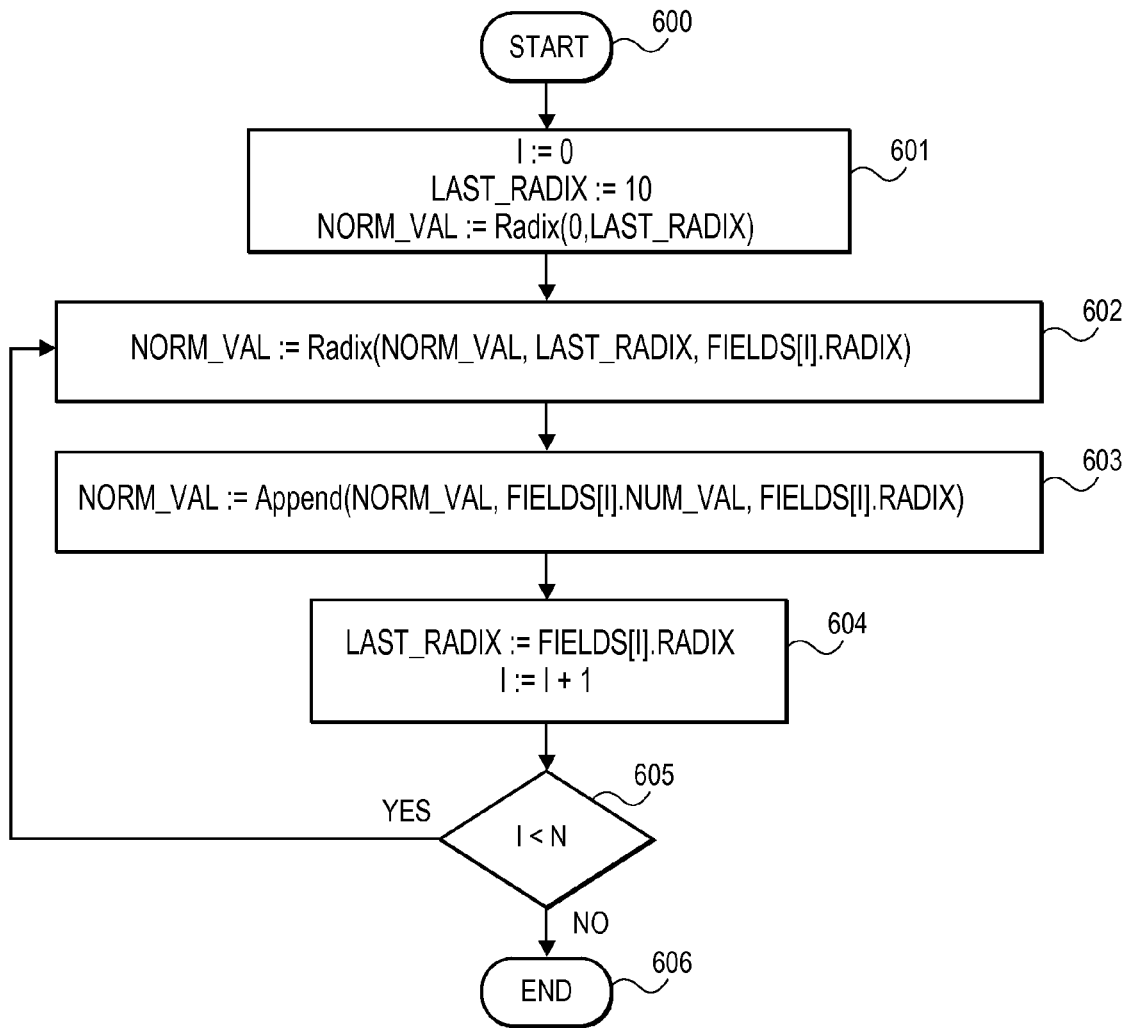
FIG. 6 shows a data-control flow diagram illustrating a method for generating a string normalized value from a plurality of numeric field values.
Figure 10:
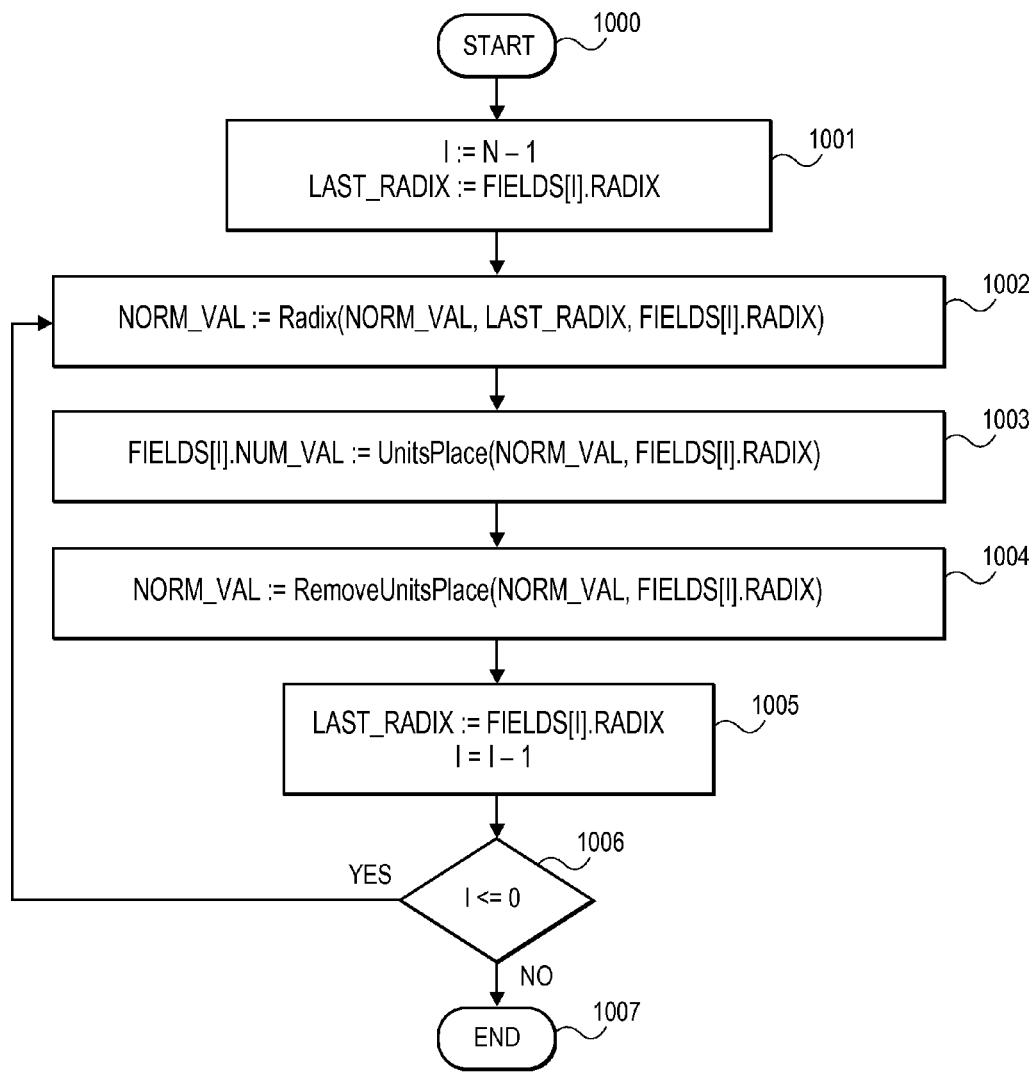
FIG. 10 shows a data-control flow diagram illustrating a method for determining a plurality of numeric field values from a string normalized value.

The "Radix(str, oldRadix, newRadix)" function, as used in FIGS. 6 and 10, may be used to calculate a string representation of a numeric value expressed in a base specified by newRadix. The string representation may use colons (":") to delimit positional places. The numeric value is determined by parsing str, assuming that str is represented in a base specified by oldRadix. For example, in one embodiment of the invention, the result of the function call Radix("100", 2, 3) would be "1:1", because the numeric value of 100 (base 2) is $1*2^2+ 0*2+0*1=4$ (base 10), which is in turn 11 (base 3).

The "Append(str, num_val, radix)" function, as used in FIG. 6, may be used to calculate a string resulting from appending the numeric num_val to the string str, where num_val is represented as a string in a base specified by radix. The new num_val is added as the rightmost positional place. For example, in one embodiment of the invention, the result of the function call Append("1:2:3", 4, "10") would be "1:2:3:4".

The "UnitsPlace(str, radix)" function, as used in FIG. 10, may be used to calculate a numeric value of the unit's (rightmost) positional place in passed string str, assuming that str is represented in a base specified by radix. For example, in one embodiment, the result of the function call UnitsPlace("11:15:12:14", 16) would be 14, because the units positional place in the string is has a value of 14.

The "RemoveUnitsPlace(str, radix)" function, as used in FIG. 10, may be used to calculate a representation of a string with the units' positional place removed. For example, in one embodiment, the result of the function call RemoveUnitsPlace("11:15:12:14", 16) would be "11:15:12:14", because the last positional value 14 would be removed.

Embodiments of the invention provide for many technical advantages. For example, embodiments of the invention provide for compact storage and representation of multiple fields values associated with fields, each of which may have a different field radix, in a single code string. In some embodiments, such as those where the normalized radix is higher than the field radices, the code representation may require fewer characters to express the data stored in the multiple field values, thus improving storage efficiency.

In some embodiments of the invention, the code may be expressed exclusively in printable characters, which allows the code have high storage efficiency while still supporting transmission in cleartext over a variety of protocols, such as HTTP and HTTPS. In addition, expressing the code in cleartext may improve user interaction by enabling users to easily read and type the activation code with standard keyboards.

In addition, embodiments of the invention allow the generation and use of activation codes without requiring each code be stored and validated using a database. This improves efficiency by reducing storage requirements, network traffic, and processing time. For example, in some embodiments of the invention, an activation code may be validated using Java-script™ code transmitted to a user's browser. Then, when the user enters an activation code, the activation code may be decoded at the user's computer. Thus, the presented method may avoid the need to transmit the activation code over a network.

Embodiments of the invention also provide the technical advantage of facilitating the sharing of user information across various parties. By storing field values in the activation code itself, information may be transmitted from an encoding party to a decoding party without requiring a connection between the encoding and decoding parties. For example, in one embodiment, an activation code may be generated by a coupon service as part of a coupon for a merchant. In accordance with embodiments of the invention, user may enter the activation code to the merchant. The merchant may verify the activation code by determining the field values stored therein, without any involvement of the coupon service. Thus, the merchant does not require a network connection to the coupon service, and the coupon service does not need to expose a query interface to the merchant.

Embodiments of the invention further provide the advantage of expediting user input to form fields. For example, in some embodiments of the invention, a merchant may provide an activation code to a user which contains user information relevant to the merchant (e.g., a user's full name, mailing address, and payment information). When the user is conducting a transaction with the merchant, the user may simply provide the activation code back to the merchant. Since the activation code stores user information, the merchant may pre-populate or automatically fill form fields which are typically required to be entered by the user. Further, since the activation code may be compressed in size as compared to the number of characters in each of the field values, the user may only need to enter a fraction of the total number of characters stored in the activation code.

Embodiments of the invention further provide the advantage of enabling a merchant verifying an activation code to identify specific elements of user input which match or do not match the activation code. In one example, a mismatch between the activation code and entered user data may be identified as due to a user's middle name being omitted in the user input. This identification may be used to prompt the user to correct the specific mismatched field. In addition, in some embodiments, a mismatch may be ignored if the merchant considers the field to be optional. This enables the verification to be tailored to the specific merchant's needs without requiring the activation code format to be changed.

The above examples highlight only a few of the advantages of using a multi-purpose device to provide membership and payment attributes.

I. Exemplary Systems

FIG. 1 shows a system according to an embodiment of the invention. The system comprises a user (or consumer) 105 who may operate a mobile device 101 or client computer 106. The user 101 may also operate mobile device 101 or another device as a portable consumer device. Client computer 106 and mobile device 101 may communicate with a number of entities via communications network 104. Communications network 104 may comprise any wired or wireless communication media, and may allow for communication between a number of other entities including a third party computer 102 and merchant computer 107. Third party computer 102 may be associated with third party database 103. Merchant computer 107 may be associated with merchant database 108. Merchant computer 107 may also be in communication and associated with acquirer 109, which may be in communication with payment processing network 110, which may in communication with issuer 111.

In some embodiments of the invention, a third party associated with third party computer 102 may be a party with some relationship to the merchant. For example, the third party may be a coupon broker, customer relationship manager, partner, or affiliate for the merchant associated with merchant computer 107. Third party computer 102 may generate an activation code using third party database 103 and send the activation code to mobile device 101. User 105 may receive the activation code and enter it into client computer 106, which may then send the activation code to merchant computer 107. In other embodiments of the invention, merchant computer 107 may generate an activation code using merchant database 108, send the activation code to client computer 106, and later receive the activation code from client computer 106.

As used herein, an "issuer" may typically refer to a business entity (e.g., a bank) that maintains financial accounts for the user 105 and often issues a portable consumer device such as a credit or debit card to the user 105. A "merchant" is typically an entity that engages in transactions and can sell goods or services. An "acquirer" is typically a business entity (e.g., a commercial bank) that has a business relationship with a particular merchant or other entity. Some entities can perform both issuer and acquirer functions. Some embodiments may encompass such single entity issuer-acquirers. Each of the entities (e.g., merchant 107, acquirer 109, payment processing network 110, and issuer 111) may comprise one or more computer apparatuses to enable communications through the communications network 104, or to perform one or more of the functions described herein.

The payment processing network 110 may include data processing subsystems, networks, and operations used to support and deliver certificate authority services, authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

The payment processing network 110 may include a server computer. A server computer is typically a powerful computer or cluster of computers. For example, the server computer can be a large mainframe, a minicomputer cluster, or a group of servers functioning as a unit. In one example, the server computer may be a database server coupled to a Web server. The payment processing network 110 may use any suitable wired or wireless network, including the Internet. As noted above, in some embodiments, the location server computer and/or location database may be located at the payment processing network 110, or the payment processing network 110 may provide data to the location server computer and/or the location database.

In a typical purchase transaction, the user 105 purchases a good or service at merchant 107 using a portable consumer device such as a mobile device 101. The user's portable consumer device can interact with an access device (not shown) at merchant 107. For example, the user may tap the portable consumer device against an NFC reader in the access device. Alternately, the user may indicate payment details to the merchant electronically, such as in an online transaction.

An authorization request message is generated by the access device and is then forwarded to the acquirer 109. After receiving the authorization request message, the authorization request message is then sent to the payment processing network 110. The payment processing network 110 then forwards the authorization request message to the corresponding issuer 111 of the portable consumer device.

An "authorization request message" may be an electronic message that is sent to a payment processing network and/or an issuer of a payment card to request authorization for a transaction. An authorization request message according to some embodiments may comply with ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. . . . . . An authorization request message may also comprise "transaction information," such as any information associated with a current transaction, such as the transaction amount, merchant identifier, merchant location, etc., as well as any other information that may be utilized in determining whether to identify and/or authorize a transaction. The authorization request message may also include other information such as information that identifies the access device that generated the authorization request message, information about the location of the access device, etc.

After the issuer 111 receives the authorization request message, the issuer 111 sends an authorization response message back to the payment processing network 110 to indicate whether or not the current transaction is authorized (or not authorized). The payment processing network 110 then forwards the authorization response message back to the acquirer 109. The acquirer 109 then sends the response message back to the merchant 107.

An "authorization response message" may be an electronic message reply to an authorization request message generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant.

After the merchant 107 receives the authorization response message, the access device at the merchant 107 may then provide the authorization response message for the user. The response message may be displayed by the contactless access device, or may be printed out on a receipt. Alternately, if the transaction is an online transaction, the merchant may provide a web page or other indication of the authorization response message.

At the end of the day, a normal clearing and settlement process can be conducted by the payment processing network 110. A clearing process is a process of exchanging financial details between and acquirer and an issuer to facilitate posting to a user's payment account and reconciliation of the user's settlement position.

Figure 2:
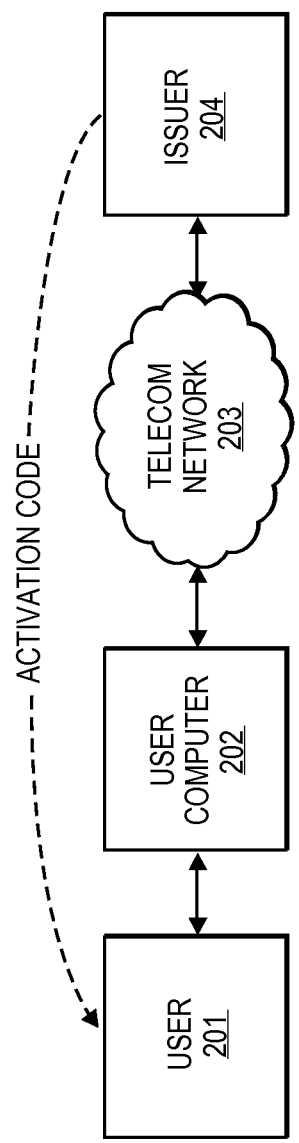
FIG. 2 illustrates another exemplary system that may be used in embodiments of the invention.

FIG. 2 shows another exemplary system that may be used in embodiments of the invention. The system comprises a user 201, a client computer 202 associated with the user 201, a communications network 203, and an issuer 204 connected to the communications network. Communications network 203 may be any suitable communications network. For example, communications network 203 may be a telecom network, a wired or wireless network, a local or wide area network, etc. In some embodiments of the invention, issuer 204 may send an activation code to user 201. The activation code may be sent using any suitable transmission mechanism. For example, issuer 204 may mail the activation code to an address associated with user 201. In other embodiments, issuer 204 may send a text message or email to user 201 containing the activation code 201. User 201 may then send the activation code to issuer 201 through client computer 202.

II. Exemplary Encoding Methods

Figure 3:
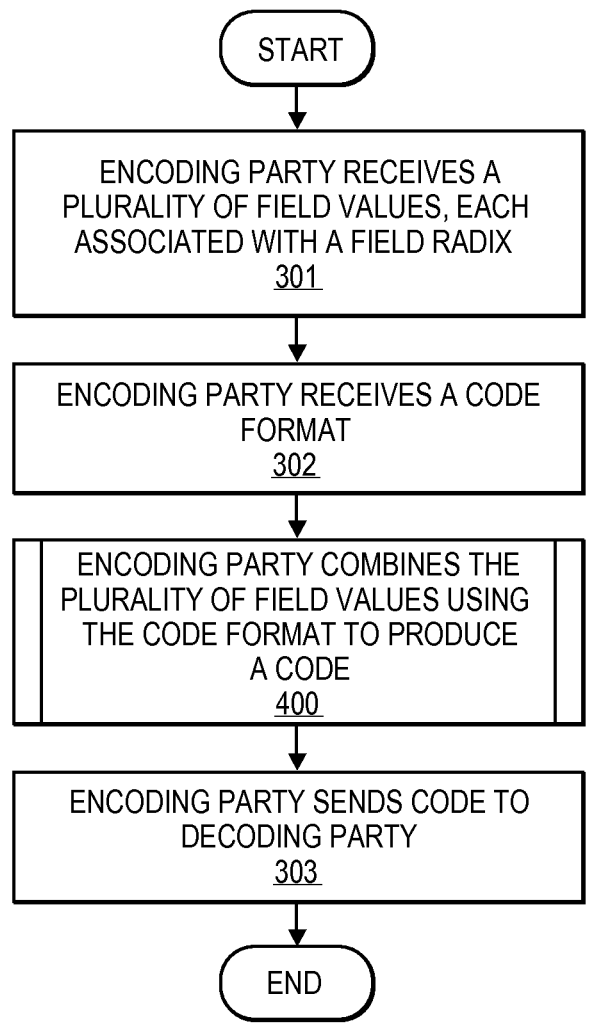
FIG. 3 illustrates a method for generating a code from field values and sending the code.

FIG. 3 illustrates a method performed at an encoding party for generating a code from field values and sending the code. In some embodiments of the invention, an encoding party may be a merchant associated with merchant computer 107, third party associated with third party computer 102, user 105, payment processing network 110, or issuer 111. The method described in FIG. 3 may be used to, in some embodiments of the invention, generate activation codes.

At step 301, the encoding party receives a plurality of field values, each associated with a field radix. The encoding party may receive the field values using any suitable method. For example, in some embodiments, the field values may be stored in a database connected to the encoding party. Alternately, in some embodiments, the field values may be received from a computer network. In other embodiments, the field values may be received from a user input device.

At step 302, the encoding party receives a code format. The code format may be received from any suitable source. For example, the code format may be retrieved from a database or received over a computer network. Alternately, the code format may be generated on-the-fly based on the plurality of field values received. The code format may include information describing the structure of fields (e.g., for each field, a field radix, one or more field values, one or more numeric field values corresponding to the field values, and an ordering of the fields).

Table 1 shows an exemplary representation of various data that may be included in a code format. An administrator, merchant computer 107, issuer 111, payment processing network 110, or other institution may define a code format comprising a plurality of fields, each with an associated field radix and field values. Each field value may be assigned a corresponding numeric field value. For example, a field "likes wine?" would have a field radix of 2, because the field is binary—either the user likes wine or they do not. However, the field "birth month" would be duodecimal, reflecting the twelve months in the year. Other fields, such as a "golf expertise level" may have an arbitrary number of field values depending on the level of detail desired. In Table 1, golf expertise is measured either as "Low", "Intermediate", or "High". Finally, some fields may be numeric. The last four digits of a social security number (SSN) may be represented as a number from 0-9999.

TABLE 1

| Index | Field | Field Radix | Field Values | Numeric Field Value(s) |
|---|---|---|---|---|
| 0 | Likes wine? | 2 | No | 0 |
|   |   |   | Yes | 1 |
| 1 | Birth Month | 12 | January-December | 0-11 |
| 2 | Golf Expertise Level | 3 | Low | 0 |
|   |   |   | Intermediate | 1 |
|   |   |   | High | 2 |
| 4 | Last Four of SSN | $10^4$ | 0000-9999 | 0-9999 |

Table 2 shows an example dataset for a user "Sara" for the fields defined in Table 1. Sara likes wine, so the numeric field value for her preference would be 1. Sara is born in June, so her birth month would be represented as 5 (January being 0). Sara is proficient at golf, so her golf expertise would be represented as 2. The last four digits of Sara's SSN are 2368, which would be represented similarly in as a numeric field value.

TABLE 2

| Index | Field | Field Value | Numeric Field Value |
|---|---|---|---|
| 0 | Likes wine? | Yes | 1 |
| 1 | Birth Month | June | 5 |
| 2 | Golf Expertise Level | Expert | 2 |
| 3 | Last Four Digits of SSN | 2368 | 2368 |

At process 400, the encoding party combines the plurality of field values using the code format to produce a code. The plurality of field values may be combined using any suitable method. In some embodiments of the invention, the method described in FIG. 4 may be used.

At step 303, the encoding party sends the code to a decoding party. In some embodiments of the invention, a party sending the field values to the encoding party indicate the decoding party. Alternately, the decoding party may be determined using the plurality of field values received. In some embodiments, the code may not be sent directly to the decoding party, but rather through one or more intermediaries. For example, the code may be sent to a user, who may subsequently send the code to a decoding party. In other embodiments, the user may be the decoding party.

In some embodiments of the invention, the encoding party may also send the code format and any other information necessary to decode the code, to the decoding party. The code format may be sent together with the code each time a code is sent to the decoding party. Alternately, the code format may be sent once, and subsequently the code may be sent standalone.

Figure 4:
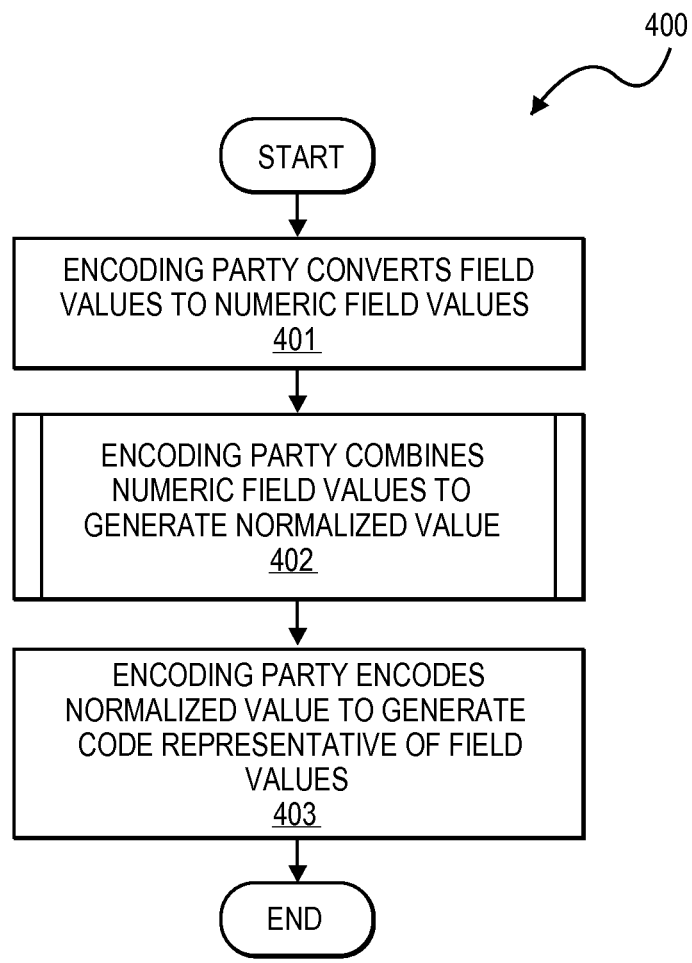
FIG. 4 illustrates a method for generating a code from field values.

FIG. 4 illustrates a method for generating a code from field values. In some embodiments of the invention, the method illustrated in FIG. 4 may be performed as an intermediary step in the method illustrated in FIG. 3.

Before starting process 400, the encoding party has access to a plurality of field values and a code format. The plurality of field values may be stored in any suitable format, such as a list or array of objects in computer memory. The code format may comprise an ordering of the plurality of field values, a mapping between field values and corresponding numeric field values, a normalized radix, and an encoding format for the normalized value.

At step 401, the encoding party converts the field values into numeric field values. The conversion may be performed using any suitable method for converting data from an arbitrary data type to a numeric format. In some embodiments, the conversion may be performed using the mapping between field values and corresponding numeric field values. In other embodiments, the conversion may be performed using built-in data type conversion or casting procedures for a programming language. At the end of step 401, each field value is converted into a corresponding numeric field value in the range [0, field radix-1], inclusive.

Figure 5:
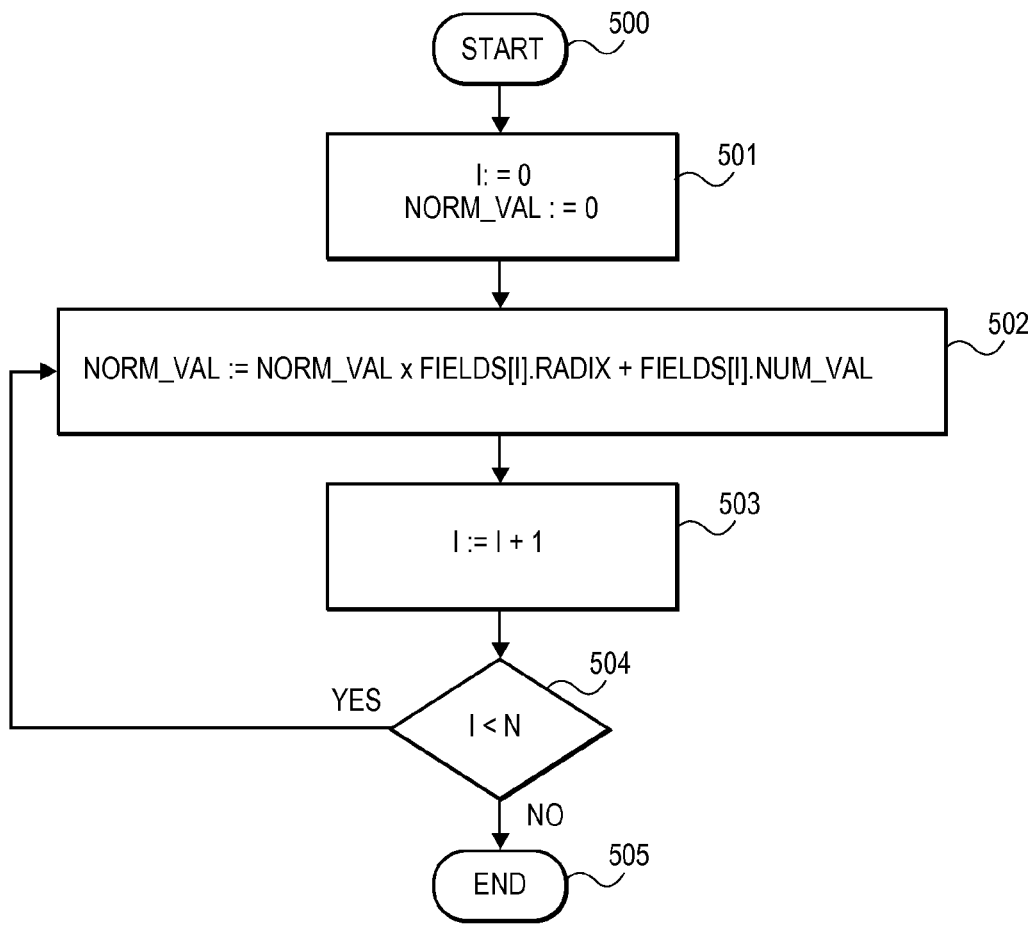
FIG. 5 shows a control data-flow diagram illustrating method for generating a numeric normalized value from a plurality of numeric field values.

At step 402, the encoding party combines numeric field values to generate a normalized value. In some embodiments of the invention, the normalized value may be represented as a numeric normalized value. A method for converting the numeric field values into a numeric normalized value is shown in FIG. 5. In other embodiments, the normalized value may be represented as a string normalized value. A method for converting the numeric field values into a string normalized value is shown in FIG. 6.

At step 403, the encoding party encodes the normalized value to generate a code representative of the field values. The code format may be used to determine the appropriate encoding. In some embodiments, the code format may specify a normalized radix for the code. For example, if the normalized radix is 10, the code may be represented as a decimal number. If the normalized radix is 16, the code may be encoded as a hexadecimal (Hex) number. If the normalized radix is 64, the code may be encoded in the BASE64 encoding. If the normalized radix is 94, the code may be encoded using the set of 94 printable ASCII characters. Alternately, in some embodiments, the normalized value may be the same as the string normalized value.

FIG. 5 shows a control data-flow diagram illustrating method for generating a numeric normalized value from a plurality of numeric field values. At starting step 500, an array FIELDS, with indices 0 through N−1 is declared and initialized, where N is the number of fields. The numeric field value for the $x^{th}$ field is indicated by FIELDS[x].NUM_VAL, and the field radix for the $x^{th}$ field is indicated by FIELDS[x].RADIX. Typically, both FIELDS[x].NUM_VAL and FIELDS[x].RADIX may be represented using an integer data type. The FIELDS array may be populated using any suitable method, such as those described above for FIGS. 3 and 4.

At step 501, counter I and current numeric normalized value NORM_VAL are initialized to zero. Counter I is a loop counter which is used to indicate an index into the FIELDS array. NORM_VAL represents the numeric normalized value to be calculated. Typically, both I and NORM_VAL may be represented using an integer data type.

At step 502, the current numeric normalized value is multiplied by the field radix of the $I^{th}$ field and added to the numeric value of the $I^{th}$ field. The result is stored as the new numeric normalized value. In effect, the multiplication of the current normalized value with the $I^{th}$ field radix makes the product evenly divide the $I^{th}$ field radix. Thus, when the $I^{th}$ numeric field value is added to the product, the resulting value will be have a remainder of the $I^{th}$ numeric value when divided by the $I^{th}$ field radix. Because the modulo operation may be used to determine the remainder given the $I^{th}$ field radix, and because both additional and multiplication are reversible, the $I^{th}$ numeric field value and the previous numeric normalized value may be determined if the $I^{th}$ field radix is known. Therefore, each iteration of the computation performed at step 502 allows the next numeric field value added to the normalized value to be later retrieved. At step 503, counter I is incremented by one.

At step 504, the conditional I<N is evaluated. If counter I is less than N, than the method moves to step 502, thus beginning the next ($I^{th}$) iteration of the loop. Otherwise, the method concludes at step 505. In effect, this loop causes the normalized value to be incremented for each numeric field value in the FIELDS array.

At step 505, I reaches N and all numeric field values have been processed. In the example shown in Table 3, this happens when I reaches 3. At step 505, the normalized value in effect contains the combination of all numeric field values.

The method described in FIG. 5 may be applied to the user information shown in Table 2 above. Table 3 shows values for the variables in FIG. 5 at various steps of the method.

TABLE 3

| I | NORM_VAL (before step 502) | FIELDS[I].RADIX | FIELDS[I].NUM_VAL | NORM_VAL (after step 502) |
|---|---|---|---|---|
| 0 | 0 | 2 | 1 | 0 × 2 + 1 = 1 |
| 1 | 1 | 12 | 5 | 1 × 12 + 5 = 17 |
| 2 | 17 | 3 | 2 | 17 × 3 + 2 = 53 |
| 3 | 53 | 10000 | 8726 | 53 × 10000 + 2368 = 532368 |
| 4 | — | — | — | 532368 (Final) |

When the method begins, at step 501, counter I and the numeric normalized value are both initialized to zero. At step 501, the normalized value is multiplied by the $0^{th}$ field radix, 2, and incremented by the $0^{th}$ numeric field value, 1. Thus result, 1, is assigned to the normalized value. At step 503, I is incremented by one to 1. Since I is less than 4, step 502 is performed again. At step 502, for I=1, the normalized value, 1, is multiplied by $1^{st}$ field radix, 12, and incremented by the $1^{st}$ numeric field value, 5. The result, 17, is assigned to the normalized value. I is again incremented to two, and step 502 is again repeated. At step 502, for I=2, the normalized value is assigned to 17 times the $2^{nd}$ field radix plus the $2^{nd}$ numeric field value, for a result of 53. On the next iteration, for I=3, the normalized value is assigned to 53 times the $3^{rd}$ field radix (10000) plus the $3^{rd}$ numeric field value (2368) to yield 532368. Once I is incremented to 4, the conditional I<N is false, and the method concludes.

Once the numeric normalized value is calculated, a code may be generated for the normalized value using any suitable encoding, as described for one embodiment in FIG. 4, step 403. If the normalized value of 532,368 was represented in Base64 encoding, the corresponding code would be "gfkA". If the normalized value is represented in base 94 encoding, the corresponding code would be the string, "]8O". In contrast, if each field value was represented separately (e.g., as "Yes", "Jun", "High", and "8726") a total of 14 characters would be needed to represent the same data. Thus, the method described achieves a significantly compressed result (the base 94 encoding requiring only 21% of the space).

FIG. 6 shows a data-control flow diagram illustrating a method for generating a string normalized value from a plurality of numeric field values. As in FIG. 5, at starting step 600, an array FIELDS, with indices 0 through N−1 is declared and initialized, where N is the number of fields. The FIELDS array represents various properties of the set of N fields. The numeric field value for the $x^{th}$ field is indicated by FIELDS [x].NUM_VAL, and the field radix for the $x^{th}$ field is indicated by FIELDS[x].RADIX. Typically, both FIELDS[x].NUM_VAL and FIELDS[x].RADIX may be represented using an integer data type. The FIELDS array may be populated using any suitable method, such as those described above for FIGS. 3 and 4.

At step 601, counter I, integer LAST_RADIX, and string NORM_VAL are initialized. Counter I is a loop counter which is used to indicate an index into the FIELDS array. Integer LAST_RADIX is a variable which indicates the field radix in which the normalized value NORM_VAL is currently represented. String NORM_VAL indicates the current normalized value of the numeric field values. I is initialized to zero, the first index of FIELDS. LAST_RADIX is initialized to 10. NORM_VAL is initialized to Radix(0,LAST_RADIX), the result of which is the string "0".

At step 602, the string normalized value is parsed and converted from a representation in the previous field radix (LAST_RADIX) to a representation in the $I^{th}$ field radix (FIELDS[I].RADIX). This step is performed using a call to the Radix function.

At step 603, a string version of the $I^{th}$ numeric field value is appended to the string normalized value. This step is performed using a call to the Append function. In effect, the string append operation is equivalent to the formula shown in FIG. 5, step 502. For instance, after the Append function is called, the $I^{th}$ numeric field value takes the ones' place of the result, and each digit in the previous string normalized value is shifted one place to the left. In a representation of a number in any radix, shifting the number one place to the left is in effect multiplying the number by that radix. Thus, since the normalized value is in the $I^{th}$ field radix when the Append function is called, the shifting is equivalent to a multiplication of the previous normalized value by the $I^{th}$ field radix. In addition, since the $I^{th}$ numeric field value takes the ones place in the result, the resulting normalized value is in effect incremented by one times the $I^{th}$ numeric field value, which is the $I^{th}$ numeric field value itself. Thus, when both the shifting of the previous normalized value and position of the $I^{th}$ numeric value in the ones place are taken into account, the numeric value of the string normalized value would be the previous normalized value times the $I^{th}$ radix, plus the $I^{th}$ numeric field value. This is precisely the formula used in FIG. 5, step 502 to calculate the new numeric normalized value. Thus, the method described in FIG. 6 has the same advantages described above for FIG. 5.

At step 604, the previous field radix is assigned to the $I^{th}$ field radix, then I is incremented by one. At step 605, the conditional I<N is evaluated. If counter I is less than N, than the method moves to step 602. Otherwise, the method concludes at step 606. In effect, this loop causes the normalized value to be incremented for each numeric field value in the set of fields.

At step 606, I reaches N and all numeric field values have been processed. Thus, the string normalized value in effect contains the combination of all numeric field values, and is expressed in the last field radix processed. In the example shown in Table 4, N is 4.

Generating a string normalized value may have several advantages. For instance, some computer systems and computer languages may only support integers of small bit widths (e.g., 8-bit or 16-bit integers). In such systems, it may be impractical or impossible to represent the normalized value numerically. Since string normalized values are not represented as a single integer, but as a sequence of characters, a string normalized value may be arbitrarily long, and thus enable representation of an arbitrarily large normalized value. This allows the method to handle more fields with higher field radices than may otherwise be possible on a given system.

The method described in FIG. 6 may also be applied to the user information shown in Table 2 above. Table 4 shows values for the variables in FIG. 6 at various steps of the method. In the shown table, the string normalized value is represented in the form "$X_{n^2}$:$Y_n$:$Z_1$", where Z is the value of the one's place, Y is the value of the n's place, X is the value of the $n^2$'s place, and where n is the radix of the string. Places may be omitted if their value is zero and no higher place has a non-zero value. For example, the string "1:5" (radix 12) indicates the number 1*12+5=17.

When the method begins, counter I is initialized to 0, and NORM_VAL is initialized to "0" (radix 10). After step 602 is executed, "0" (radix 10) is converted to "0" (radix 2), since FIELDS[0].RADIX is 2. Then, after step 603, NORM_VAL becomes "0:1" (radix 2), because FIELDS[I].NUM_VAL is 1. At step 604, LAST_RADIX becomes 2 and I becomes 1. Since I is less than 3, step 602 is executed, resulting in NORM_VAL being assigned "1" (radix 12). After step 603, NORM_VAL becomes "15" (radix 12), because FIELDS[1].NUM_VAL is 5. On the third iteration, when I is 2, NORM_VAL is assigned to "1:2:2" (radix 3) at step 602. Then, after step 603, NORM_VAL becomes "1:2:2:2", because FIELDS[2].NUM_VAL is 2. On the fourth iteration, when I is 3, NORM_VAL becomes "53" (radix 1000). After step 603, NORM_VAL becomes "53:2368". Finally, once I reaches 4, I is no longer less than N, and so the method concludes at step 606.

Once the string normalized value is calculated, a code may be generated for the normalized value using any suitable encoding, as described for one embodiment in FIG. 4, step 403. For example, the normalized value of "1222" may be represented using a single character code, "U", by calling Radix(NORM_VAL, 3, 94) to encode the string normalized value in base 94. In contrast, if each field value was represented separately with a single character, a total of three characters would be needed to represent the same data. Thus, like FIG. 5, the method described in FIG. 6 achieves a significantly compressed result.

III. Exemplary Decoding Methods

Figure 7:
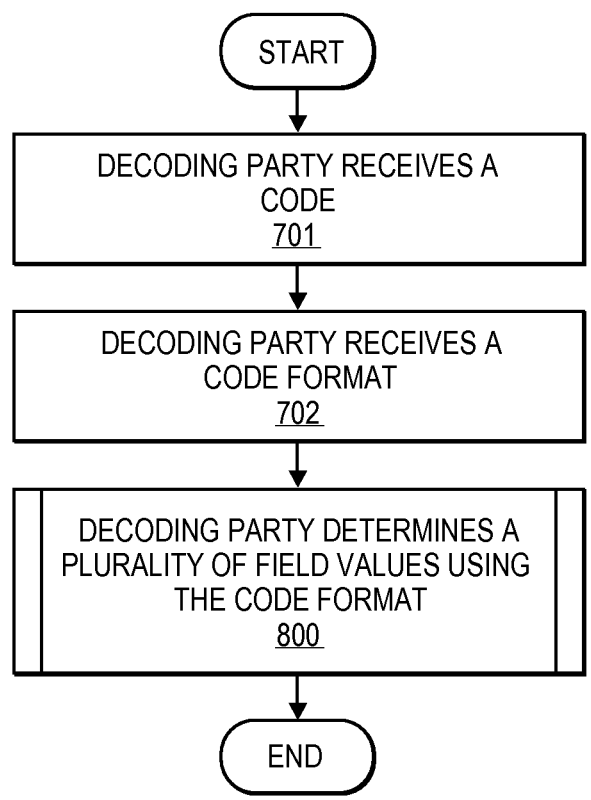
FIG. 7 illustrates a method of decoding a code to determine a plurality of field values.

FIG. 7 illustrates a method performed at a decoding party for decoding a code to determine a plurality of field values. In some embodiments of the invention, a decoding party may be a merchant associated with merchant computer 107, third party associated with third party computer 102, user 105, payment processing network 110, or issuer 111. In some embodiments of the invention, the method described in FIG. 7 may be performed by a client computer 106, or by a server computer.

At step 701, the decoding party receives a code. The decoding party may receive the code using any suitable method. For example, in some embodiments, client computer 106 may receive a web page comprising Javascript™ operable to decode the code. Then, a user may input the code to the web page. Once the user enters the code, the Javascript may automatically determine field values associated with the code. Alternately, in some embodiments, the code may be received at a server computer, such as merchant computer 107 or issuer 204.

At step 702, the encoding party receives a code format. The code format may be received from any suitable source. For example, the code format may be retrieved from a database or received over a computer network. Alternately, in some embodiments, the code format may be integrated with Java-

TABLE 4

| I | LAST_RADIX | FIELDS[I].RADIX | NORM_VAL (after s602) | FIELDS[I].NUM_VAL | NORM_VAL (after s603) |
|---|---|---|---|---|---|
| 0 | 10 | 2 | "0" | 1 | "0:1" |
| 1 | 2 | 12 | "1" | 5 | "1:5" |
| 2 | 12 | 3 | "1:2:2" | 2 | "1:2:2:2" |
| 3 | 3 | 10000 | "53" | 2368 | "53:2368" |
| 4 | — | — | — | — | "53:2368" (Final) | script™ or other executable code so that the executable code is configured to decode codes with using a pre-defined code format. In some embodiments, the code format may be received together with the code. Alternately, the code format may be received separately from the code.

At the start of process 800, the decoding party determines a plurality of field values using the code format. The plurality of field values may be determined using any suitable method. In some embodiments of the invention, the method described in FIG. 8 may be used.

Figure 11:
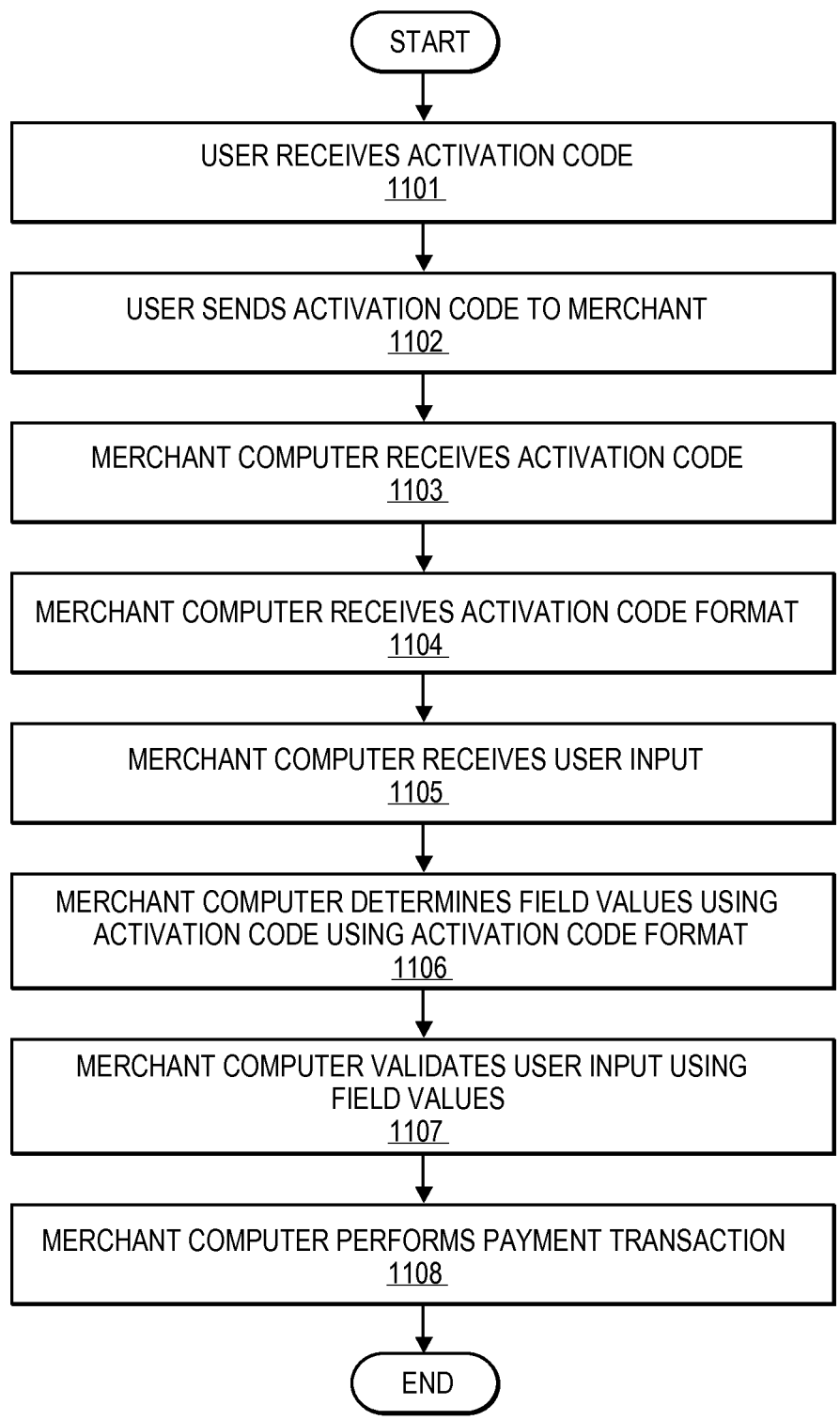
FIG. 11 shows an exemplary method for validating an activation code using embodiments of the invention.
Figure 13:
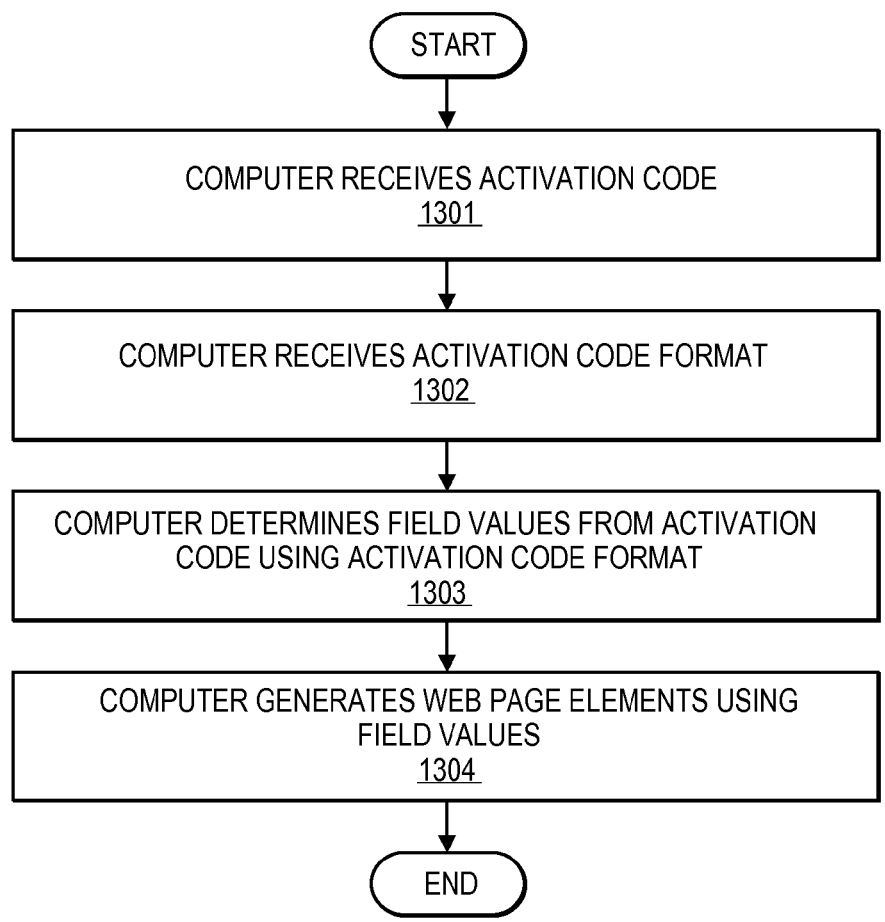
FIG. 13 shows an exemplary method for generating web page elements using an activation code in accordance with embodiments of the invention.
Figure 15:
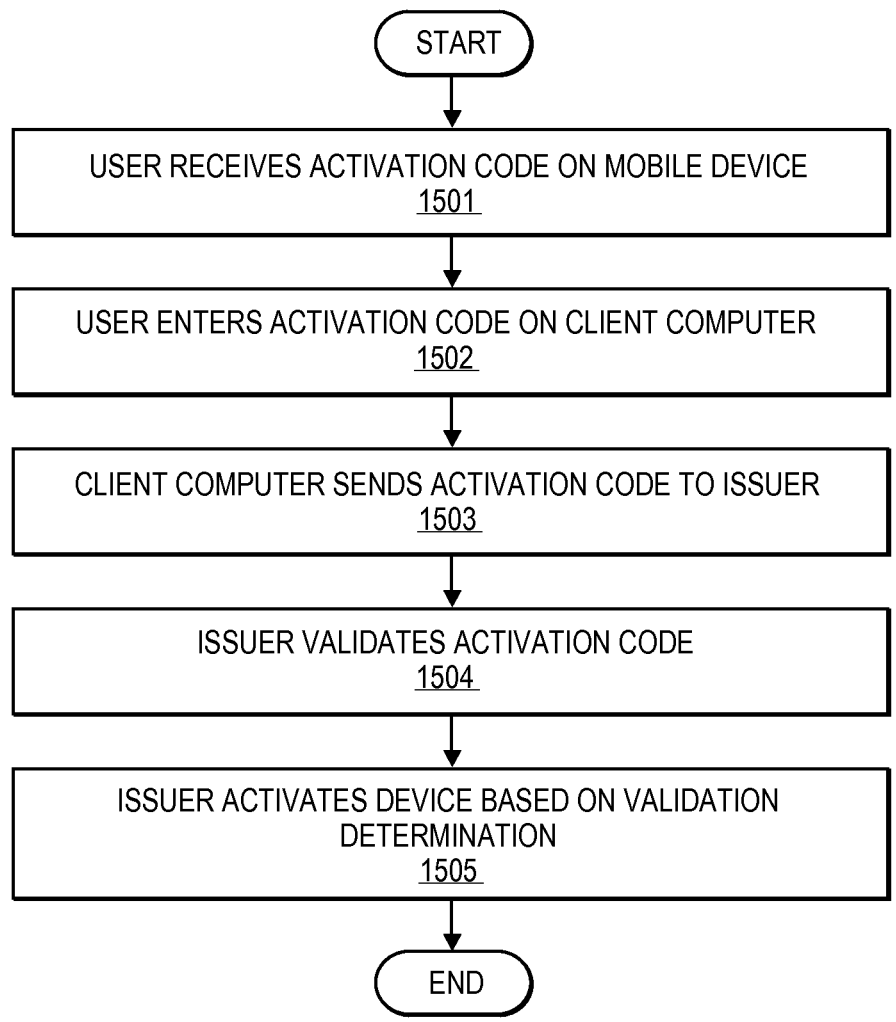
FIG. 15 shows an exemplary method for activating a device using an activation code in accordance with embodiments of the invention.

At ending step 703, the decoding party has determined the plurality of field values stored in the code. The decoding party may use this determination for a variety of use cases. For example, the decoding party may use the field values to validate user input. FIG. 11 illustrates a method for validating user input in one embodiment of the invention. In addition, the field values may be used to generate web page elements. FIG. 13 illustrates a method for generating web page elements using the field values in another embodiment of the invention. In yet another embodiment, the field values may be used to activate a device, as shown in FIG. 15.

Figure 8:
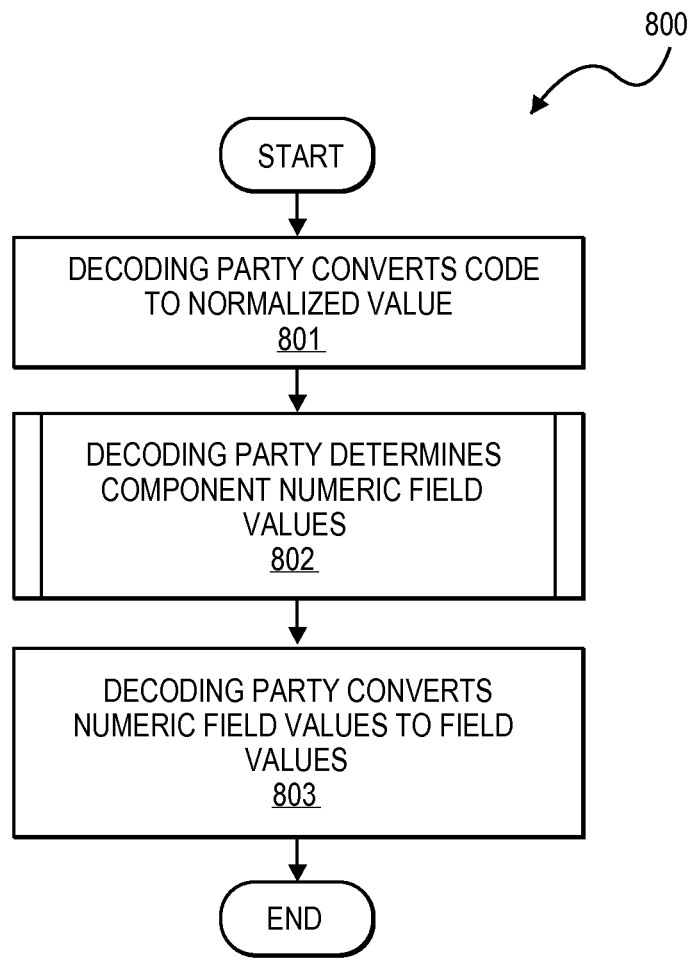
FIG. 8 illustrates a method for determining a plurality of field values from a code using a code format.

FIG. 8 illustrates a method for determining a plurality of field values from a code using a code format. In some embodiments, the method shown in FIG. 8 may be performed as an intermediary step in the method shown in FIG. 7.

At starting step 800, the decoding party has access to a code and a code format. The code may be stored in any suitable format, such as a string, object, or text file in computer memory. The code format may comprise an ordering of the plurality of field values, a mapping between field values and corresponding numeric field values, a normalized radix, and an encoding format for the normalized value.

At step 801, the decoding party converts the code to a normalized value. Typically, the code format may be used to determine a method for decoding the code. For example, if the code is encoded using an encoding scheme (e.g., hexadecimal, Base64, or base 94), the code format may indicate the encoding scheme and an appropriate decoding scheme. In addition, the code format may include a normalized radix in which the code is represented. The result of step 801 is a normalized value, which may be stored as a numeric normalized value, string normalized value, or any other suitable format.

Figure 9:
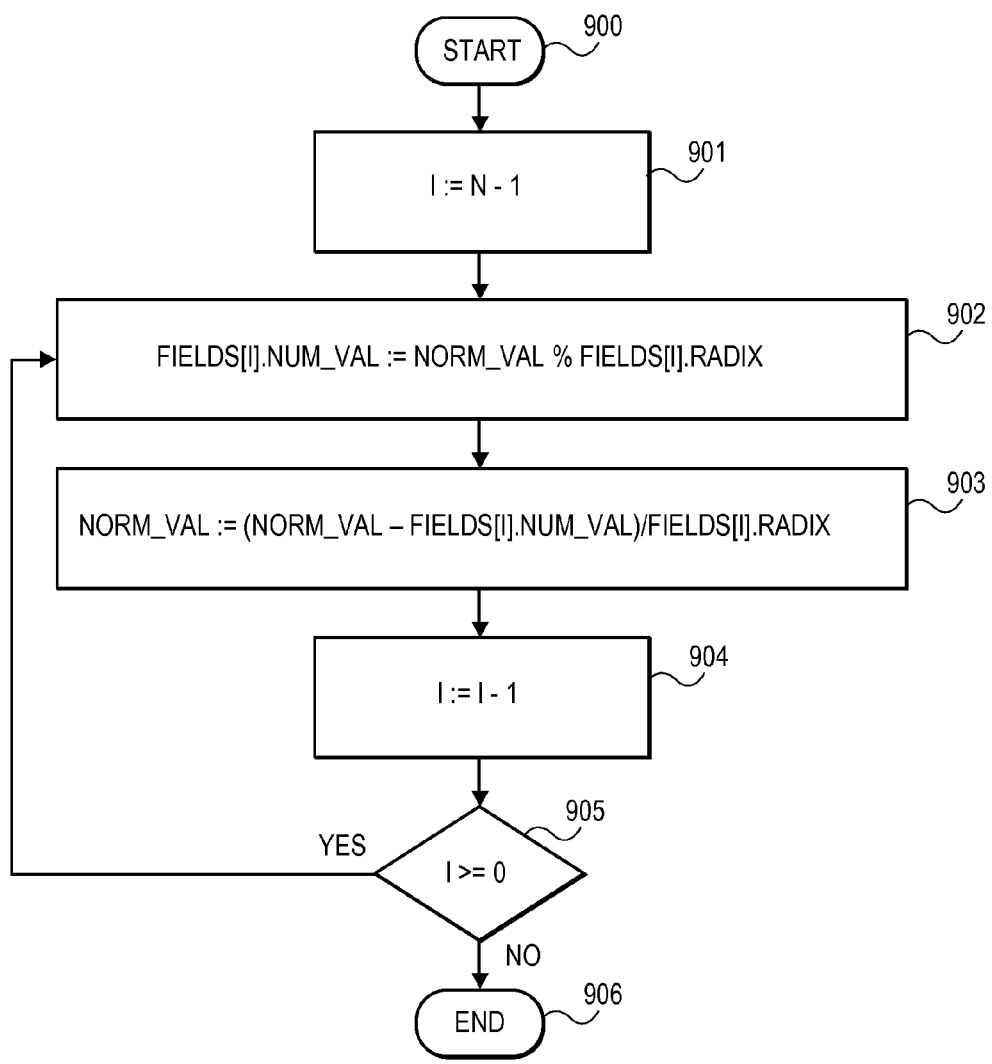
FIG. 9 shows a control data-flow diagram illustrating method for determining a plurality of numeric field values from a numeric normalized value.

At process 802, the decoding party determines component numeric field values comprising the normalized value. In some embodiments of the invention, the normalized value may be represented as a numeric normalized value. A method for determining the numeric field values from a numeric normalized value is shown in FIG. 9. In other embodiments, the normalized value may be represented as a string normalized value. A method for determining the numeric field values from a string normalized value is shown in FIG. 10.

At step 803, the decoding party converts the numeric field values to field values. Step 803 may be performed similarly, but in the opposite direction, to the method described in FIG. 4, step 401. In general, the conversion may be performed using any suitable method for converting data from an arbitrary data type to a numeric format. In some embodiments, the conversion may be performed using the mapping between the numeric field values and corresponding field values. In other embodiments, the conversion may be performed using built-in data type conversion or casting procedures for a programming language. In some embodiments of the invention, the code format may be used in the conversion.

At ending step 804, the decoding party has determined each field value represented in the code. In some embodiments of the invention, the field values may be in similar or the same format as those originally used to generate the code by the encoding party.

FIG. 9 shows a control data-flow diagram illustrating method for determining a plurality of numeric field values from a numeric normalized value. At starting step 900, a numeric normalized value, NORM_VAL, is declared and initialized to the value decoded from the code. In addition, an array FIELDS, with indices 0 through N−1 is declared, where N is the number of fields. The numeric field value to be determined for the $x^{th}$ field is indicated by FIELDS[x].NUM_VAL. The field radix for the $x^{th}$ field is known and indicated by FIELDS[x].RADIX. Typically, both FIELDS[x].NUM_VAL and FIELDS[x].RADIX may be represented using an integer data type. The FIELDS[x].RADIX values may be populated using any suitable method, such as from the code format as described above in FIGS. 7 and 8.

At step 901, counter I is initialized to N−1. Counter I is a loop counter which is used to indicate an index into the FIELDS array. Typically, counter I is represented using an integer data type.

At step 902, the $I^{th}$ numeric field value is assigned to the current normalized value modulo the $I^{th}$ field radix. Since counter I is initialized to N−1, the first numeric field value to be determined by the decoding party (the $(N-1)^{st}$ numeric field value) is the last numeric field value to be added to the numeric normalized value by the encoding party (see FIG. 5, step 502). Accordingly, the modulo operation performed on the first iteration of step 902 retrieves the $(N-1)^{st}$ numeric normalized value.

At step 903, the normalized value is assigned to the previous normalized value minus the $I^{th}$ numeric field value, divided by the $I^{th}$ field radix. This operation is the mathematical inverse function of the operation performed in FIG. 5, step 502. Accordingly, the numeric normalized value becomes what it was during the $(I-1)^{st}$ iteration of the method performed by the encoding party.

At step 904, counter I is decremented by one. This decrement, and steps 902 and 903, allow the method to successively determine the numeric normalized value in the previous iteration of the method performed by the encoding party. Since each iteration of the combining method described in FIG. 5 added a numeric field value to the normalized value, each iteration of the determining method may determine the numeric field value added in the iteration. Thus, as I is decremented from N−1 to 0, the numeric field values associated with each iteration will be stored into the corresponding index in the FIELDS array.

At step 905, the conditional I>=0 is processed. If counter I is greater than or equal to zero, the next iteration of steps 902-904 begins. If counter I is less than zero, then an iteration has already been performed for each numeric field value, and so the method concludes in step 906.

By step 906, all numeric field values have been determined and assigned to the corresponding index in the FIELDS array. Thus, the numeric normalized value has been used to determine each numeric field value.

The method described in FIG. 9 may be applied to the user information shown in Table 2 and generated into a numeric normalized value in Table 3. In the shown example, the generated code was "]8O" in base 94, corresponding to a numeric normalized value of 532368. Accordingly, Table 5 assumes a received numeric normalized value of 532368 and the same code format used in Table 3. Table 5 shows values for the variables in FIG. 9 at various steps of the method.

TABLE 5

| I | NORM_VAL (before step 903) | FIELDS[I].RADIX | FIELDS[I].NUM_VAL (after step 902) | NORM_VAL (after step 903) |
|---|---|---|---|---|
| 3 | 532368 | 10000 | 532368% 10000 = 2368 | (532368 − 2368)/ 10000 = 53 |
| 2 | 53 | 3 | 53% 3 = 2 | (53 − 2)/3 = 17 |
| 1 | 17 | 12 | 17% 12 = 5 | (17 − 5)/12 = 1 |
| 0 | 1 | 2 | 1% 2 = 1 | (1 − 1)/2 = 0 |
| −1 | — | — | — | 0 (Final) |

Thus, starting from I=3, each successive iteration of the method determines the $I^{th}$ numeric field value and decrements the numeric normalized value accordingly. After the method is performed for I=2, I=1, and I=0, each numeric field value is determined and the numeric normalized value is zero, reflecting the initialization value in FIG. 5, step 501.

FIG. 10 shows a data-control flow diagram illustrating a method for determining a plurality of numeric field values from a string normalized value. At starting step 1000, a string normalized value, NORM_VAL, is declared and initialized to the value decoded from the code. As described for FIG. 9, an array FIELDS, with indices 0 through N−1 is declared, where N is the number of fields. The numeric field value to be determined for the $x^{th}$ field is indicated by FIELDS[x].NUM_VAL. The field radix for the $x^{th}$ field is known and indicated by FIELDS[x].RADIX. Typically, both FIELDS[x].NUM_VAL and FIELDS[x].RADIX may be represented using an integer data type. The FIELDS[x].RADIX values may be populated using any suitable method, such as from the code format as described above in FIGS. 7 and 8.

At step 1001, counter I and integer LAST_RADIX are initialized. Counter I is a loop counter which is used to indicate an index into the FIELDS array. Integer LAST_RADIX is a variable which indicates the field radix in which the normalized value NORM_VAL is currently represented. I is initialized to N−1, the last index of FIELDS. LAST_RADIX is initialized to FIELDS[I].RADIX, the $I^{th}$ field radix.

At step 1002, the string normalized value is parsed and converted from a representation in the previous field radix (LAST_RADIX) to a representation in the $I^{th}$ field radix (FIELDS[I].RADIX). This step is performed using a call to the Radix function.

At step 1003, the value stored at the units place of the string normalized value is assigned to the $I^{th}$ numeric field value. In effect, this operation retrieves the $I^{th}$ numeric field value because reverses the Append function call performed in FIG. 6, step 603, whereby the $I^{th}$ numeric field value is appended to the end of the string normalized value.

At step 1004, the units place is removed from the string normalized value. This operation reverses the Append function call and results in the string normalized value taking the value it had before the $I^{th}$ iteration of the encoding method described in FIG. 6.

At step 1005, counter I is decremented by one. At decision step 1006, the conditional I>=0 is evaluated. If I is greater than or equal to zero, another iteration of steps 1002-1005 is performed. Otherwise, the method concludes at step 1007.

Since counter I is initialized to N−1 and decremented by one on each iteration of step 1005, steps 1002-1004 in effect reverse the operations performed in FIG. 6, steps 02-603. Thus, as I is decremented from N−1 to 0, the numeric field values associated with each iteration will be stored into the corresponding index in the FIELDS array.

By step 1007, all numeric field values have been determined and assigned to the corresponding index in the FIELDS array. Thus, the string normalized value has been used to determine each numeric field value.

The method described in FIG. 10 may be applied to the user information shown in Table 2 and generated into a string normalized value in Table 4. In the shown example, the generated code in base 94 was "]8O", corresponding to a string normalized value of "53:2368" (radix 10000). Accordingly, Table 6 assumes a received string normalized value of "53: 2368" and the same code format used in Table 4. Table 5 shows values for the variables in FIG. 10 at various steps of the method.

TABLE 6

| I | NORM_VAL (after s1002) | FIELDS[I].RADIX | FIELDS[I].NUM_VAL (after step 1003) | NORM_VAL (after step 1004) |
|---|---|---|---|---|
| 3 | "53:2368" | 10000 | LastChar("53:2368") = 2368 | "53" |
| 2 | "1:2:2:2" | 3 | LastChar("1222", 3) = 2 | "1:2:2" |
| 1 | "1:5" | 12 | LastChar("15, 12") = 5 | "1" |
| 0 | "1" | 2 | LastChar("1", 2) = 1 | "" |
| −1 | — | — | — | "" (Final) |

When the method begins, the string normalized value is assigned to "53:2368" (radix 10000), as decoded from the received code. At step 1001, I is initialized to 3 and the last radix is initialized to the $3^{rd}$ field radix, which is 10000. At step 1002, the normalized value is converted to radix 10000. However, since the normalized value is already in radix 10000, it does not change. At step 1003, the $3^{rd}$ numeric field value is assigned to the units place of the normalized value, "2368". At step 1004, the units place of the normalized value is removed, leaving the normalized value as 53. At step 1005, the last radix is assigned to 10000, and I is decremented by one to 2. At step 1006, the conditional I>=0 is evaluated. Since I is 2, step 1002 is executed again.

At step 1002, the normalized value is converted to the $2^{nd}$ field radix, 3. The resulting normalized value is "1:2:2:2" (radix 3). At step 1003, the $2^{nd}$ numeric field value is assigned units place of the normalized value, 2. At step 1004, the units place is removed from the normalized value, leaving a normalized value of "1:2:2". The process repeats until each numeric field value is assigned, and I is decremented to −1. Then, the conditional I>=0 is false, and the method concludes>

Thus, starting from I=3, each successive iteration of the method determines the $I^{th}$ numeric field value and truncates the string normalized value accordingly. After the method is performed for I=3, I=2, I=1, and I=0, each numeric field value is determined and the string normalized value is the empty string.

IV. Exemplary Validation Methods

FIG. 11 shows an exemplary method for validating an activation code using embodiments of the invention.

At step 1101, a user 105 receives an activation code. In some embodiments of the invention, the user 105 may receive the activation code from a third party computer 102. In some embodiments, the third party 102 may generate the activation code in accordance with FIGS. 4-8. The third party computer 102 may use the third party database 103 to generate the activation codes (e.g., to retrieve field values). The third party computer 102 may then send the activation code to the user over any suitable channel. For example, the third party database may use communications network 104 to send an email, text message, personal message, or notification to user 105. In some embodiments of the invention, the activation code may be received by mobile device 101 or client computer 106.

In some embodiments of the invention, the third party computer 102 may be a coupon vendor. The coupon vendor may be associated with one or more merchants. The coupon vendor may store a list of users which have requested coupons in third party database 103. In one embodiment of the invention, the coupon vendor computer 102 may identify a user 105 and a merchant 107, and generate a coupon including an activation code which entitles the user 105 to receive a discount at merchant 107. The activation code may be generated from field values associated with the user or the merchant. For example, field values may include a user identifier (e.g., a user's name), user's date of birth, and a merchant identifier (e.g., a merchant's name). The field values may also include information relating to the discount, for example a SKU and discount amount for the discounted item. The activation code may be included, for example, in a uniform resource locator (URL) to a web page. The coupon vendor 102 may then send the coupon to user 105, for example to the user's mobile device 101 or client computer 106.

In other embodiments of the invention, the user may receive the activation code from a merchant computer. For example, in some embodiments of the invention, the merchant computer may use merchant database 108 to determine a user 105 which may be interested in discounts at the merchant. The merchant computer 107 may then generate a coupon including an activation code and send the coupon to user 105, for example to the user's mobile device 101 or client computer 106.

At step 1102, the user 105 sends the activation code to merchant computer 107. The user 105 need not send the activation code immediately after receiving it. For example, if the user 105 receives a coupon containing the activation code, the user 105 may wait several weeks or months until the user 105 next visits the merchant to use the activation code. In some embodiments of the invention, the user 105 may store the activation code on mobile device 101, client computer 106, another device, or may print the activation code onto a physical medium (e.g., paper).

The user 105 may send the activation code to the merchant using any suitable method. For example, if the user 105 is conducting an online shopping transaction, the user 105 may enter the activation code as part of a URL provided with the activation code. An exemplary embodiment of a form field is shown in FIG. 12.

Figure 12:
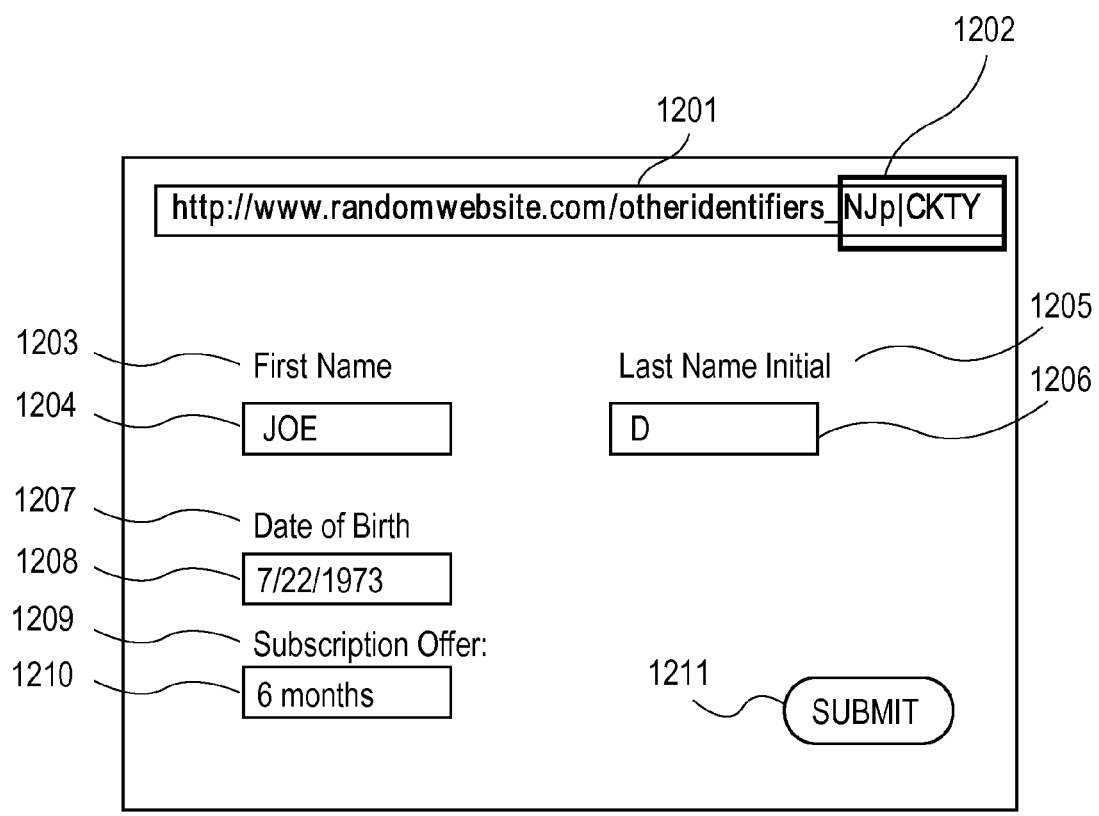
FIG. 12 shows an exemplary user interface wherein a user enters a URL including an activation code.

FIG. 12 shows an exemplary user interface wherein a user enters a URL 1201 including an activation code 1202. The URL 1201 may be to a merchant website, so that a merchant computer 107 may receive an HTTP or HTTPS request for a web page. The merchant computer 107 may receive the request and generate a web page using the activation and including one or more form fields and headers 1203-1210.

The form fields 1203-1210 may prompt the user 105 for user input regarding the transaction. For example, First Name header 1203 and First Name text box 1204 may request the first name of a user 105. Last Name Initial header 1205 and Last Name Initial text box 1206 may request the last initial of a user 105. Date of Birth header 1207 and Date of Birth text box 1208 may request the date of birth of the user 105. Subscription Offer header 1209 and Subscription Offer text box 1210 may request the length of a subscription offer. User 105 may submit the user input by using submit button 1211.

Returning to FIG. 11, at step 1103, the merchant computer 107 receives the activation code. In some embodiments, the merchant may also receive user input.

At step 1104, the merchant computer 107 receives the activation code format. In some embodiments of the invention, the merchant computer 107 may receive the activation code format each time it receives an activation code. In other embodiments, the activation code may be received once. For example, the merchant may receive the activation code format in a separate transmission from third party computer 102. Alternately, the merchant may automatically determine an activation code format when generating an activation code.

At step 1105, the merchant computer 107 receives user input. In some embodiments of the invention, the user input may be transaction information. The transaction information may comprise a payment transaction for some goods or services indicated by user 105. The transaction information may include information regarding items ordered, payment details, user information, or other user input. In some embodiments of the invention, the transaction information may be received from client computer 106. Alternately, in some embodiments, the transaction information may be received from a point of sale terminal at a merchant.

At step 1106, the merchant computer determines field values from the activation code using the activation code format. In some embodiments of the invention, step 1106 may be performed in accordance with FIGS. 7-10. In some embodiments, some or all of the determination may be performed by other parties. For example, in some embodiments of the invention, the merchant computer may generate a web page comprising Javascript™ code operable to determine field values from an activation code. The web page may be sent to user 105. Then, when user 105 enters an activation code, the web page may be used to determine the field values associated with the activation code. The code may send the merchant computer 107 an intermediate result (e.g., numeric field values), or may send merchant computer 107 the field values determined from the activation code.

At step 1107, the merchant computer 107 validates the user input using the field values. For example, some or all of the field values determined in step 1106 may be compared with the user input. If the user input and transaction data are consistent, then the user input may be determined to be valid. Otherwise, the user input may be determined to be invalid.

For example, as shown in FIG. 12, user input may include the contents of text boxes 1204, 1206, 1208, and 1210. The user input may be submitted to merchant computer 107 using the submit button 1211. The user input may then be compared with field values comprising activation code 1202. In the example shown in FIG. 12, the field values match the user input. Accordingly, the user input may be determined to be valid or invalid.

In some embodiments, if the user input is determined to be invalid, the one or more field values which mismatch the user input may be identified to the user. For example, if the user input first name does not match the corresponding field value, the merchant 107 may resend the form to user 105 with the first name field highlighted. This may enable the user 105 to know which field should be corrected. Thus, the ability for each field value to be determined from the activation enables an improved user interface. In addition, in some embodiments, certain fields may be determined to be optional by merchant 107. If a mismatch exists for such field values, the user input may still be validated. Thus, each merchant 107 may customize validation of the activation code without requiring a change to the activation code format.

At step 1108, merchant computer 107 may perform a payment transaction based on the validation determination. For example, in an embodiment where the activation code is associated with a coupon and the user input is transaction information, the validation of the activation code may determine whether the user 105 is eligible for a discount. Accordingly, a payment transaction may be initiated in accordance with the flow described in FIG. 1. For example, in one embodiment of the invention, the merchant computer 107 may generate an authorization request message and send the authorization request message to an issuer associated with user 105 via acquirer 109 and payment processing network 110. The issuer 110 may return an authorization response message to merchant computer 107 indicating whether authorization is successful. If so, the payment transaction may proceed.

V. Exemplary Web Page Generation Methods

FIG. 13 shows an exemplary method for generating web page elements using an activation code in accordance with embodiments of the invention. The method shown in FIG. 13 may be performed by any suitable computer. For example, mobile device 101, client computer 106, third party computer 102, merchant computer 107, and issuer 111 may all perform the described method.

At step 1301, a computer receives an activation code. The activation code may be received using any suitable method. In some embodiments of the invention, the activation code may be entered by user 105. An example user interface that may be used to receive an activation code from a user is shown in FIG. 14(*a*). Alternately, the activation code may be retrieved from a database or sent over a computer network.

FIG. 14(*a*) illustrates a web page comprising a form that may be used in some embodiments of the invention. In one embodiment, the web page may be viewed on client computer 106. The web page may be viewed through a web browser, including a location bar 1401*a*. The web page may have multiple form fields, such as Activation Code header 1402*a*, Activation Code text box 1403*a*, First Name field 1404*a*, Last Name Initial field 1405*a*, Date of Birth field 1406*a*, and Subscription Offer 1407*a*. The user may enter an activation code in the text box for Activation Code field 1402*a*. In some embodiments of the invention, entry of the activation code may cause a Javascript™ function to be executed, causing the activation code to be sent to a computer. Alternately, the function may simply store the activation code locally.

At step 1302, the computer receives an activation code format. In some embodiments of the invention, the computer may receive the activation code format each time it receives an activation code. In other embodiments, the activation code may be received once. For example, the computer may receive the activation code format in a separate transmission.

At step 1303, the computer determines field values from the activation code using the activation code format. In some embodiments of the invention, step 1303 may be performed in accordance with FIGS. 7-10.

At step 1304, the computer generates web page elements using the field values. For example, the computer may automatically fill form fields depending on the entered activation code. An exemplary user interface illustrating one embodiment of the invention is shown in FIG. 14(*b*).

FIG. 14(*b*) illustrates a web page comprising a form that is automatically filled using the activation code. Once Activation Code field 1403*b* is filled, user information fields 1404*b*-1407*b* are automatically populated. Thus, the user may simply enter the activation code to avoid manually entering each field. Further, since the activation code is significantly fewer characters than the total of the fields, the activation code may enable the user to fill the form more efficiently.

Returning to FIG. 13, at step 1304, in other embodiments of the invention, the web page elements may be generated on the computer and sent to another computer. For example, merchant computer 107 may generate a web page based on an HTTP request comprising the activation code sent from client computer 106 or mobile device 101.

VI. Exemplary Device Activation Methods

FIG. 15 shows an exemplary method for activating a device using an activation code in accordance with embodiments of the invention. In some embodiments, the method described in FIG. 15 may be performed when user 105 receives a device from issuer 111. The device may be any suitable device, such as a credit card, debit card, smart card, code card, or contactless payment device.

At step 1501, user 105 receives an activation code on mobile device 101. In some embodiments, an issuer 111 will send the activation code to the user 101. For example, the issuer 111 may send a text message, email, or automated phone call (such as an IVR call) notifying the user 105 of the activation code.

The received activation code may be generated from a plurality of field values. The field values may include personal information, such as a user's legal name, the last four digits of the user's social security number, a user's account number, or any other suitable information. The field values may also include device information, such as a serial number or product number of the device.

At step 1502, the user enters the activation code on client computer 106. In some embodiments, the user may automatically enter the activation code using the mobile device 101. Alternately, the user may manually enter the activation code.

At step 1503, the client computer 106 sends the activation code to the issuer. In some embodiments of the invention, the issuer 111 will provide a location such as a URL, email address, or phone number to enter the activation code. The location may be provided with the activation code. Alternately, in some embodiments, the user 105 may enter the activation code using an account management feature provided by the issuer 111.

At step 1504, once the issuer 111 receives the activation code, the issuer 111 validates the activation code. The validation may be performed in accordance with the methods shown in FIGS. 7-10 and described above. The validation may use information supplied by the user 105, such as personal information or device information. At step 1505, if the supplied information corresponds to the field values stored in the activation code, the issuer may activate the device.

VII. Exemplary Computer Apparatuses

Figure 16:
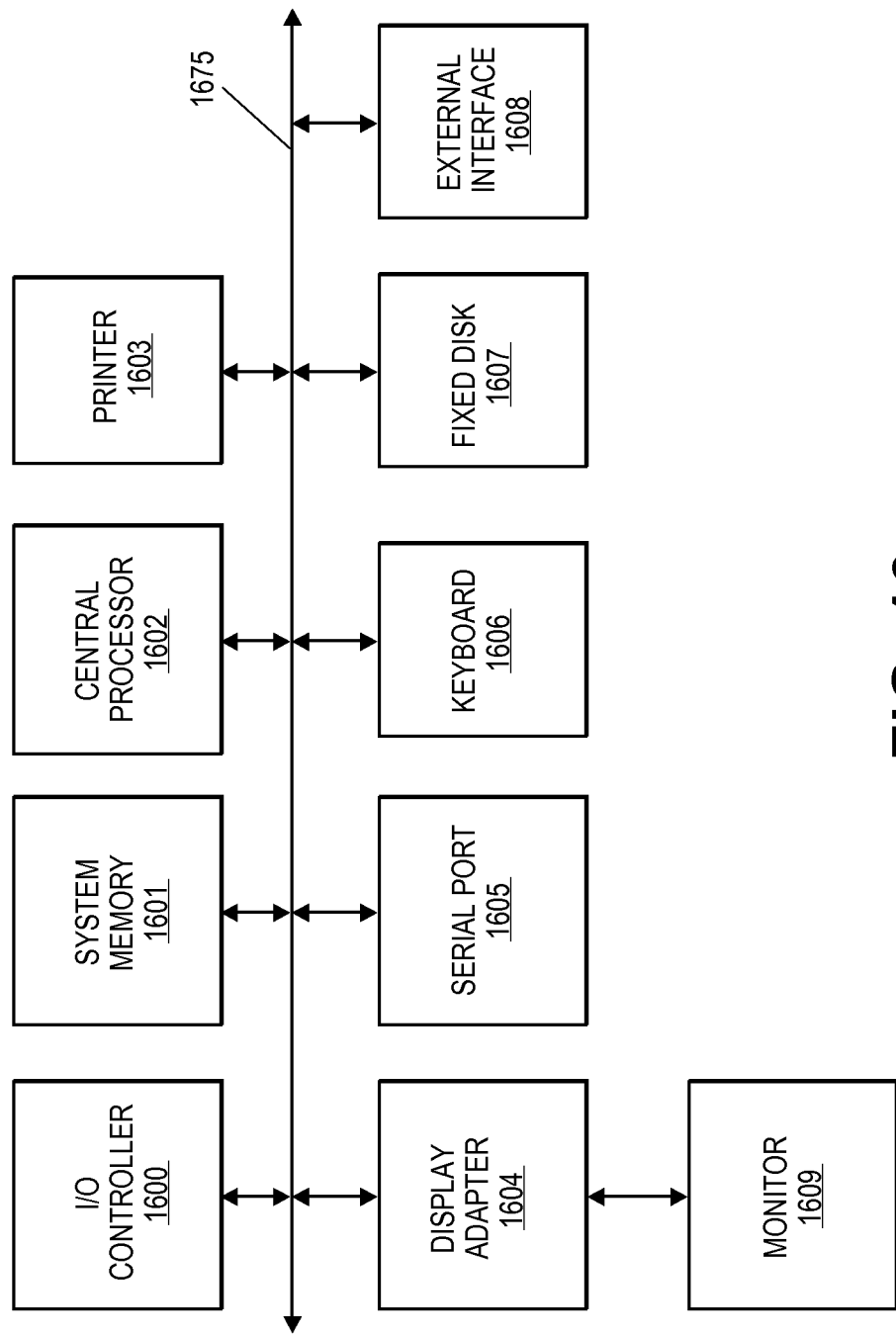
FIG. 16 is a high level block diagram of a computer system that may be used to implement any of the entities or components described above.

FIG. 16 is a high level block diagram of a computer system that may be used to implement any of the entities or components described above. The subsystems shown in FIG. 16 are interconnected via a system bus 1675. Additional subsystems include a printer 1603, keyboard 1606, fixed disk 1607, and monitor 1609, which is coupled to display adapter 1604. Peripherals and input/output (I/O) devices, which couple to I/O controller 1600, can be connected to the computer system by any number of means known in the art, such as a serial port. For example, serial port 1605 or external interface 1608 can be used to connect the computer apparatus to a wide area network such as the Internet, a mouse input device, or a scanner. The interconnection via system bus 1675 allows the central processor 1602 to communicate with each subsystem and to control the execution of instructions from system memory 1601 or the fixed disk 1607, as well as the exchange of information between subsystems. The system memory 1601 and/or the fixed disk may embody a computer-readable medium.

VIII. Additional Embodiments

Additional embodiments of the invention relate to the assignment of an activation code to a product. The activation code may be generated by a product manufacturer from a product identifier such as a product key, an item identifier such as a serial number, and/or various field values describing the product. For example, an activation code may be associated with a toy that includes the toy model, toy serial number, and toy's color. The activation code may be included with the product, such as being printed on a product tag.

A user 105 purchasing the toy may then enter the activation code into a manufacturer website to register the product. Registering the product may entitle the user 105 to certain benefits, such as an improved warranty. The manufacturer may use field values determined from the activation code to quickly determine the product being registered. This provides several advantages to the manufacturer, such as a more efficient registration system. In addition, since the activation codes according to embodiments of the invention may be compressed in size, more information may be included in an activation code of the same size.

An additional embodiment of the invention discloses a computer-implemented method. The method comprises receiving a code, decoding, by a processor, the code to generate a normalized value, and determining, by the processor, a plurality of numeric field values comprising the normalized value. The method may further comprise receiving a code format. The method may further comprise converting the numeric field values to field values.

An additional embodiment of the invention discloses a computer-implemented method. The method comprises generating, by a processor, an activation code, and an activation code format, and sending the activation code. The method may further using a database to generate the activation code.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A computer-implemented method comprising:
   receiving, by a computer, a code format, wherein the code format indicates a plurality of fields included in a code and an ordering of the fields;
   determining, by the computer, numeric field values associated with the plurality of fields by:
      receiving a plurality of field values associated with the plurality of fields, each of the fields being associated with a field radix; and
      converting the field values into numeric field values;
   combining, by the computer, the numeric field values to generate a normalized value, wherein the normalized value is associated with a normalized radix, and wherein the normalized radix is greater than the field radices; and
   generating, by the computer, a code representative of the plurality of field values using the normalized value, wherein the code format is known by a second computer, wherein the second computer is operable to decode the code.

2. The method of claim 1, wherein the code is compressed as compared to the plurality of field values.

3. The method of claim 1, wherein the code is an activation code represented in printable ASCII characters.

4. The method of claim 1, wherein the code format is received as a computer-readable file.

5. A server computer, comprising:

a processor; and a non-transitory computer-readable storage medium, comprising code executable by the processor for implementing a method comprising:

receiving a code format, wherein the code format indicates a plurality of fields included in a code and an ordering of the fields;

determining numeric field values associated with the plurality of fields by:

receiving a plurality of field values associated with the plurality of fields, each of the fields being associated with a field radix; and converting the field values into numeric field values;

combining the numeric field values to generate a normalized value, wherein the normalized value is associated with a normalized radix, and wherein the normalized radix is greater than the field radices; and generating a code representative of the plurality of field values using the normalized value, wherein the code format is known by a second computer, wherein the second computer is operable to decode the code.

6. The server computer of claim 5, wherein the code is compressed as compared to the plurality of field values.

7. The server computer of claim 5, wherein the code is an activation code represented in printable ASCII characters.

8. A computer-implemented method comprising:

receiving, by a computer, an activation code generated using a second computer;

receiving, by the computer, an activation code format, wherein the activation code format indicates a plurality of fields included in the activation code, each of the fields being associated with a field radix, and an ordering of the fields;

determining, by the computer, a normalized value from the activation code, wherein the normalized value is associated with a normalized radix, wherein the normalized radix is greater than the field radices; and determining, by the computer, a plurality of field values using the normalized value derived from the activation code and the activation code format.

9. The method of claim 8, wherein the method further comprises: validating a user input using one or more of the plurality of field values.

10. The method of claim 9, wherein the user input is validated if the user input matches a corresponding field value from the activation code.

11. The method of claim 8, wherein the method further comprises: generating web page elements using one or more of the plurality of field values.

12. The method of claim 11, wherein the computer is a client computer, and wherein the activation code entered by a user into the client computer.

13. The method of claim 12, wherein the generating web page elements comprises filling a plurality of fields in a web page form.

14. A computer, comprising:

a processor; and a non-transitory computer-readable storage medium, comprising code executable by the processor for implementing a method comprising:

receiving an activation code generated using a second computer;

receiving a activation code format, wherein the activation code format indicates a plurality of fields included in the activation code, each of the fields being associated with a field radix, and an ordering of the fields;

determining a normalized value from the activation code, wherein the normalized value is associated with a normalized radix, wherein the normalized radix is greater than the field radices; and retrieving a plurality of field values using the normalized value derived from the activation code and the activation code format.

15. The computer of claim 14, wherein the method further comprises: validating a user input using one or more of the plurality of field values.

16. The computer of claim 14, wherein the method further comprises: generating web page elements using one or more of the plurality of field values.

* * * * *

UNITED STATES PATENT AND TRADEMARK OFFICE
CERTIFICATE OF CORRECTION

PATENT NO. : 9,075,653 B2
APPLICATION NO. : 13/794613
DATED : July 7, 2015
INVENTOR(S) : Mark Carlson et al.

It is certified that error appears in the above-identified patent and that said Letters Patent is hereby corrected as shown below:

IN THE CLAIMS

In Claim 12 in Column 26, line 11 please replace "wherein the activation code entered by a" with --wherein the activation code is entered by a--

In Claim 13 in Column 26, lines 13 and 14 please replace "wherein the generating web page elements comprises filling a plurality of fields in a web" with --wherein generating web page elements comprises filling the plurality of fields in a web--

Signed and Sealed this
Twenty-fourth Day of November, 2015

Michelle K. Lee
*Director of the United States Patent and Trademark Office*